(12) United States Patent
Ootorii

(10) Patent No.: US 10,948,654 B2
(45) Date of Patent: Mar. 16, 2021

(54) OPTICAL WAVEGUIDE SHEET, OPTICAL TRANSMISSION MODULE, AND MANUFACTURING METHOD FOR AN OPTICAL WAVEGUIDE SHEET

(71) Applicant: SONY CORPORATION, Tokyo (JP)

(72) Inventor: Hiizu Ootorii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/069,415

(22) PCT Filed: Dec. 13, 2016

(86) PCT No.: PCT/JP2016/086965
§ 371 (c)(1),
(2) Date: Jul. 11, 2018

(87) PCT Pub. No.: WO2017/130584
PCT Pub. Date: Aug. 3, 2017

(65) Prior Publication Data
US 2019/0018190 A1    Jan. 17, 2019

(30) Foreign Application Priority Data

Jan. 29, 2016    (JP) .............................. JP2016-016214

(51) Int. Cl.
*G02B 6/12*    (2006.01)
*G02B 6/122*    (2006.01)
(Continued)

(52) U.S. Cl.
CPC ....... *G02B 6/1228* (2013.01); *G02B 6/12002* (2013.01); *G02B 6/13* (2013.01);
(Continued)

(58) Field of Classification Search
CPC ...... G02B 6/1228; G02B 6/13; G02B 6/4206; G02B 6/4214
(Continued)

(56) References Cited

U.S. PATENT DOCUMENTS 6,272,275 B1    8/2001    Cortright et al.
6,907,173 B2 *  6/2005    Hiramatsu ............. G02B 6/122
                                                    385/123

(Continued)

FOREIGN PATENT DOCUMENTS

AU    7824200 A    1/2001
CN    101218527 A    7/2008
(Continued)

OTHER PUBLICATIONS

International Search Report and Written Opinion of PCT Application No. PCT/JP2016/086965, dated Feb. 21, 2017, 10 pages of ISRWO.

*Primary Examiner* — Jerry M Blevins
(74) *Attorney, Agent, or Firm* — Chip Law Group

(57) ABSTRACT

An optical waveguide sheet according to the present technology includes a core and a cladding. The core is extending in a first direction and including a maximum diameter portion in a plane parallel to a second direction orthogonal to the first direction and a third direction orthogonal to the second direction is maximum, a minimum diameter portion in the plane parallel to the second direction and the third direction is minimum, and a taper portion in which widths of the core in both directions of the second direction and the third direction gradually change in the first direction between the maximum diameter portion and the minimum diameter portion, the core being provided such that the maximum diameter portion and the minimum diameter portion are alternately arranged in the first direction with the
(Continued)

taper portion therebetween. The cladding is provided around the core.

12 Claims, 26 Drawing Sheets

(51) Int. Cl.
*G02B 6/13* (2006.01)
*G02B 6/43* (2006.01)
*G02B 6/14* (2006.01)
*G02B 6/138* (2006.01)
*G02B 6/42* (2006.01)

(52) U.S. Cl.
CPC ............... *G02B 6/14* (2013.01); *G02B 6/43* (2013.01); *G02B 6/138* (2013.01); *G02B 6/4206* (2013.01); *G02B 6/4214* (2013.01)

(58) Field of Classification Search
USPC .......................................................... 385/129
See application file for complete search history.

(56) References Cited

U.S. PATENT DOCUMENTS

| | | | |
|---|---|---|---|
| 7,903,921 B2 | 3/2011 | Ostergard | |
| 8,588,566 B2 | 11/2013 | Matsuyama et al. | |
| 2005/0018990 A1* | 1/2005 | Shimizu | G02B 6/1221 385/129 |
| 2008/0273829 A1* | 11/2008 | Saida | G02B 6/12011 385/14 |
| 2009/0169152 A1 | 7/2009 | Ostergard | |
| 2010/0067846 A1* | 3/2010 | Tokushima | G02B 6/1228 385/14 |
| 2010/0086255 A1* | 4/2010 | Ishizaka | G02B 6/1228 385/31 |
| 2011/0013868 A1* | 1/2011 | Suzumura | G02B 6/0001 385/32 |
| 2011/0014575 A1* | 1/2011 | Hikita | G02B 6/138 430/321 |
| 2011/0085771 A1 | 4/2011 | Matsuyama et al. | |
| 2012/0039563 A1* | 2/2012 | Shibata | G02B 6/1221 385/14 |
| 2012/0321244 A1* | 12/2012 | Suzuki | G02B 6/305 385/14 |
| 2012/0327751 A1* | 12/2012 | Iwanabe | G11B 5/314 369/13.02 |
| 2015/0260915 A1* | 9/2015 | Kitamura | G02B 6/136 385/131 |
| 2015/0301275 A1* | 10/2015 | Andle | G02B 6/293 385/43 |
| 2016/0025928 A1* | 1/2016 | Onawa | G02B 6/14 385/14 |
| 2016/0054216 A1* | 2/2016 | Sokol | G01N 19/04 73/800 |
| 2016/0093760 A1* | 3/2016 | Kallos | G02B 6/1226 136/259 |

FOREIGN PATENT DOCUMENTS

| | | |
|---|---|---|
| CN | 102057306 A | 5/2011 |
| EP | 1899755 A1 | 3/2008 |
| EP | 2290415 A1 | 3/2011 |
| EP | 1899755 B1 | 1/2013 |
| JP | 07-063935 A | 3/1995 |
| JP | 2009-500668 A | 1/2009 |
| JP | 2010-271371 A | 12/2010 |
| JP | 2011-018076 A | 1/2011 |
| JP | 4683152 B2 | 5/2011 |
| JP | 2011-221195 A | 11/2011 |
| KR | 10-2011-0025640 A | 3/2011 |
| TW | 552441 B | 9/2003 |
| TW | 201007235 A | 2/2010 |
| TW | 201222034 A | 6/2012 |
| WO | 2001/001175 A1 | 1/2001 |
| WO | 2007/007134 A1 | 1/2007 |
| WO | 2009/151045 A1 | 12/2009 |
| WO | 2011/125658 A1 | 10/2011 |

* cited by examiner

OPTICAL WAVEGUIDE SHEET, OPTICAL TRANSMISSION MODULE, AND MANUFACTURING METHOD FOR AN OPTICAL WAVEGUIDE SHEET

CROSS REFERENCE TO RELATED APPLICATIONS

This application is a U.S. National Phase of International Patent Application No. PCT/JP2016/086965 filed on Dec. 13, 2016, which claims priority benefit of Japanese Patent Application No. JP 2016-016214 filed in the Japan Patent Office on Jan. 29, 2016. Each of the above-referenced applications is hereby incorporated herein by reference in its entirety.

TECHNICAL FIELD

The present technology relates to an optical waveguide sheet and an optical transmission module that can be used for optical communication and to a manufacturing method for an optical waveguide sheet.

BACKGROUND ART

Optical connection cables used for transmitting optical signals are required to reduce both loss and cost. Here, optical waveguides of optical fibers and the like generally include fixed-diameter cores. However, in the case where the core diameter is fixed, there is a trade-off relationship in input and output of light.

Specifically, in optical coupling between an optical waveguide and a photoelectric conversion element, when light enters the optical waveguide, vignetting and leakage in the optical coupling are smaller and the loss is lower with a core having a larger diameter. On the other hand, when light is emitted from the optical waveguide, vignetting and leakage in the optical coupling are smaller and the loss is lower with a core having a smaller diameter.

In view of this, forming an optical waveguide in a taper shape has been considered. For example, Patent Literature 1 has disclosed an optical coupling device having a taper shape whose thickness and width gradually become smaller.

CITATION LIST

Patent Literature

Patent Literature 1: Japanese Patent Application Laid-open No. HEI07-063935

DISCLOSURE OF INVENTION

Technical Problem

However, it is not easy to manufacture an optical coupling device as described in Patent Literature 1. Although it is possible to manufacture an optical coupling device by using a semiconductor step and the like if the optical coupling device has a shape (one-dimensional taper shape) either one of the thickness and the width of which gradually becomes smaller, it is highly difficult to manufacture an optical coupling device having a shape (two-dimensional taper shape) both of the thickness and the width of which gradually become smaller.

Further, a light exposure step and the like are used in the semiconductor step, and thus a wafer size and a glass panel size are used as criteria. Therefore, it is difficult to ensure an apparatus necessary for increasing the length, and it takes high cost. For example, no report examples that an optical waveguide having a two-dimensional taper shape and having a length of 50 cm or more could be successfully fabricated are known.

Therefore, it has been difficult to achieve reductions both in loss and cost with an optical waveguide having a two-dimensional taper shape.

In view of the above-mentioned circumstances, it is an object of the present technology to provide an optical waveguide sheet and an optical transmission module that can reduce the loss and cost and a manufacturing method for an optical waveguide sheet.

Solution to Problem

In order to accomplish the above-mentioned object, an optical waveguide sheet according to an embodiment of the present technology includes a core and a cladding.

The core is a core extending in a first direction and including a maximum diameter portion in which a cross-sectional area of the core in a plane parallel to a second direction orthogonal to the first direction and a third direction orthogonal to the second direction is maximum, a minimum diameter portion in which the cross-sectional area of the core in the plane parallel to the second direction and the third direction is minimum, and a taper portion in which widths of the core in both directions of the second direction and the third direction gradually change in the first direction between the maximum diameter portion and the minimum diameter portion, the taper portion being continuous with the maximum diameter portion and the minimum diameter portion, the core being provided such that the maximum diameter portion and the minimum diameter portion are alternately arranged in the first direction with the taper portion therebetween.

The cladding is provided around the core.

With this configuration, the core has a periodic structure in which the maximum diameter portion and the minimum diameter portion are alternately provided with the taper portion therebetween. The core has such a shape that the widths of the taper portion in two directions of the second direction and the third direction gradually change. Thus, the core has a two-dimensional taper shape. By using the maximum diameter portion as a light incident surface and using the minimum diameter portion as a light-emitting surface in this core, it is possible to reduce the optical coupling loss of the incident light and the emitted light. Further, the core has the periodic structure, and thus, even if the optical waveguide sheet is made with an arbitrary length, it is possible to use the maximum diameter portion as the light incident surface and use the minimum diameter portion as the light-emitting surface.

The core may include a plurality of cores arranged in the second direction via the cladding.

With this configuration, the plurality of cores can be each used as an optical waveguide.

The plurality of cores may be provided such that the maximum diameter portions are opposed to each other and the minimum diameter portions are opposed to each other in the second direction.

With this configuration, in using the maximum diameter portion as the light incident surface and using the minimum diameter portion as the light-emitting surface, it is possible to set the light transmission directions to be the same between the plurality of cores.

The plurality of cores may be provided such that the maximum diameter portions are opposed to the minimum diameter portions in the second direction between the adjacent cores.

With this configuration, in using the maximum diameter portion as the light incident surface and using the minimum diameter portion as the light-emitting surface, it is possible to set the light transmission directions to be opposite directions between the adjacent cores.

The maximum diameter portion and the minimum diameter portion may each have a fixed length in the first direction.

With this configuration, the maximum diameter portion and the minimum diameter portion each have a fixed length in the first direction, and thus it becomes easy to position the light incident surface and the light-emitting surface in the first direction when forming the light incident surface in the maximum diameter portion and forming the light-emitting surface in the minimum diameter portion.

The optical waveguide sheet may further include
a sheet-like base material, in which
the core may be formed on the base material, and
the cladding may be formed on the base material and the core.

The optical waveguide sheet may further include
a sheet-like base material, in which
the cladding may include a first cladding formed on the base material and a second cladding formed on the first cladding and the core.

In order to accomplish the above-mentioned object, an optical transmission module according to an embodiment of the present technology includes an optical waveguide sheet, a first optical connector, and a second optical connector.

The optical waveguide sheet includes a core extending in a first direction and including a maximum diameter portion in which a cross-sectional area of the core in a plane parallel to a second direction orthogonal to the first direction and a third direction orthogonal to the second direction is maximum, a minimum diameter portion in which the cross-sectional area of the core in the plane parallel to the second direction and the third direction is minimum, and a taper portion in which widths of the core in both directions of the second direction and the third direction gradually change in the first direction between the maximum diameter portion and the minimum diameter portion, the taper portion being continuous with the maximum diameter portion and the minimum diameter portion, the core being provided such that the maximum diameter portion and the minimum diameter portion are alternately arranged in the first direction with the taper portion therebetween, and a cladding provided around the core.

The first optical connector causes light to enter the maximum diameter portion.

Light emitted from the minimum diameter portion enters the second optical connector.

In order to accomplish the above-mentioned object, a manufacturing method for an optical waveguide sheet according to an embodiment of the present technology is a manufacturing method for an optical waveguide sheet including:

applying a core material onto a sheet member;
transferring a shape of a groove to the core material by rotating a cylindrical transfer roll having a cylindrical surface in which the groove is formed while pressing the cylindrical transfer roll against the core material;
forming a core by curing the core material;
applying a cladding material onto the sheet member and the core; and
forming a cladding by curing the cladding material, in which
the groove has such a shape that a core extends in a first direction and includes a maximum diameter portion in which a cross-sectional area of the core in a plane parallel to a second direction orthogonal to the first direction and a third direction orthogonal to the second direction is maximum, a minimum diameter portion in which the cross-sectional area of the core in the plane parallel to the second direction and the third direction is minimum, and a taper portion in which widths of the core in both directions of the second direction and the third direction gradually change in the first direction between the maximum diameter portion and the minimum diameter portion, the taper portion being continuous with the maximum diameter portion and the minimum diameter portion, the core being provided such that the maximum diameter portion and the minimum diameter portion are alternately arranged in the first direction with the taper portion therebetween.

With this configuration, it is possible to continuously form cores having a two-dimensional taper shape by using the cylindrical transfer roll in which the groove having the above-mentioned shape is formed. The cores have the periodic structure, and thus it is possible to form the cores with an infinite length by using the cylindrical transfer roll.

The manufacturing method for an optical waveguide sheet may further include
a step of cutting the optical waveguide sheet in such a manner that the core includes at least one maximum diameter portion, at least one minimum diameter portion, and at least one taper portion.

In the manufacturing method for an optical waveguide sheet,
the base material may be conveyed in a roll-to-roll process.

The sheet member may be a base material, and
the step of applying the core material onto the sheet member may include applying the core material onto the base material.

The sheet member may include a base material and a lower cladding layer stacked on the base material, and
the step of applying the core material onto the sheet member may include applying the core material onto the lower cladding layer.

Advantageous Effects of Invention

As described above, in accordance with the present technology, it is possible to provide an optical waveguide sheet and an optical transmission module that can reduce the loss and cost and a manufacturing method for an optical waveguide sheet. It should be noted that the effects described here are not necessarily limitative and any effect described in the present disclosure may be provided.

MODE(S) FOR CARRYING OUT THE INVENTION

An optical transmission module according to an embodiment of the present technology will be described.

[Configuration of Optical Transmission Module]

Figure 1:
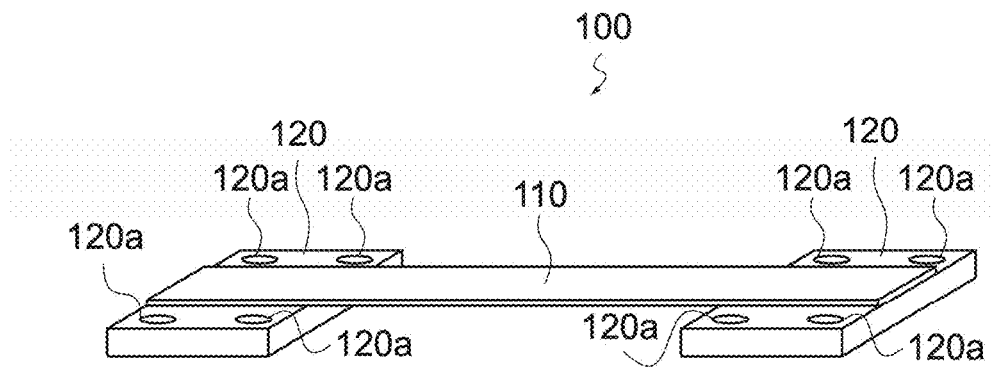
FIG. 1 A perspective view of an optical transmission module according to an embodiment of the present technology.
Figure 2:
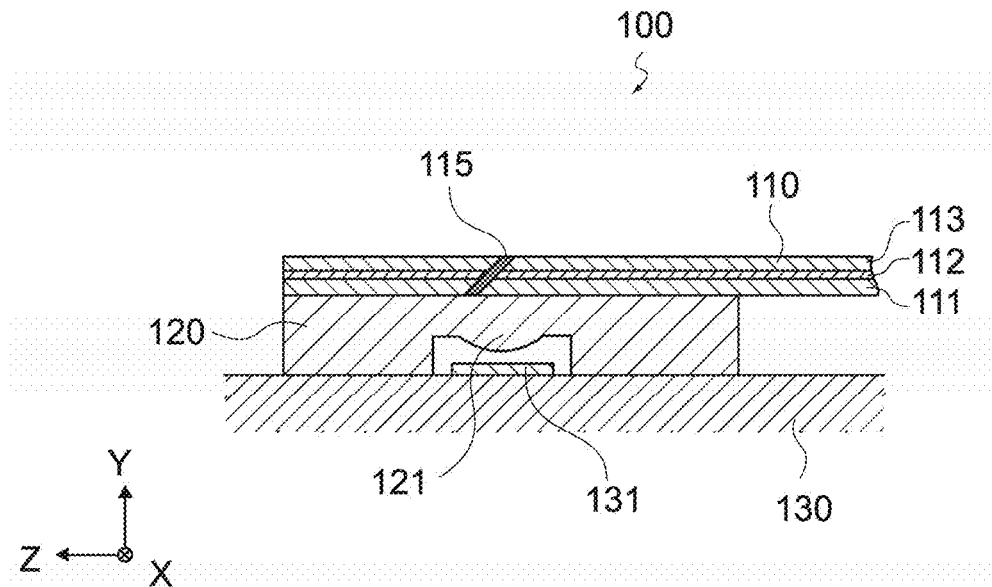
FIG. 2 A cross-sectional view of the optical transmission module.

FIG. 1 is a perspective view showing a configuration of an optical transmission module 100 according to an embodiment of the present technology. FIG. 2 is a cross-sectional view of the optical transmission module 100 and a connection target object 130. Note that three directions orthogonal to one another in the following figures will be defined an X direction, a Y direction, and a Z direction, respectively.

As shown in these figures, the optical transmission module 100 includes an optical waveguide sheet 110 and optical connectors 120. The optical waveguide sheet 110 is extended in the Z direction, and the optical connectors 120 are respectively provided at both ends of the optical waveguide sheet 110. Note that the optical connector 120 may be provided at only one end of the optical waveguide sheet 110.

Figure 3:
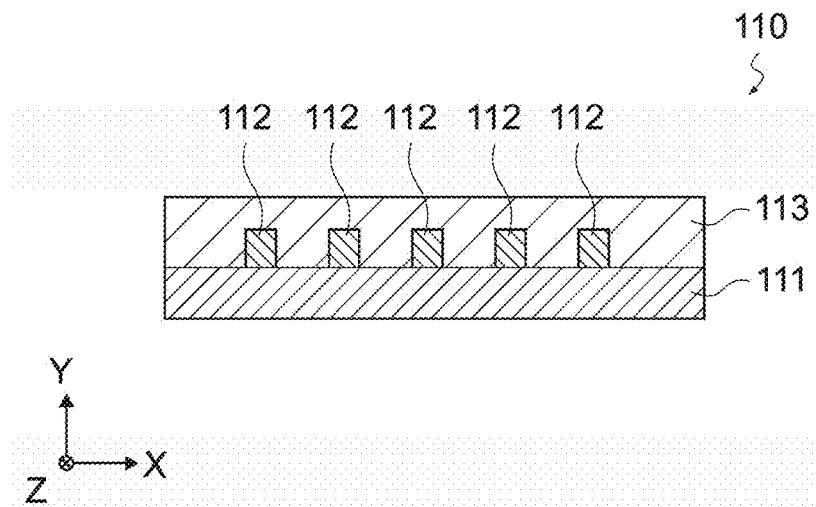
FIG. 3 A cross-sectional view of an optical waveguide sheet provided in the optical transmission module.

The optical waveguide sheet 110 transmits optical signals between the optical connectors 120. FIG. 3 is a cross-sectional view of the optical waveguide sheet 110. As shown in the figure, the optical waveguide sheet 110 includes a base material 111, cores 112, and a cladding 113.

The base material 111 is a sheet-like member made of synthetic resin and the like and is favorably flexible. The base material 111 is made of polyethylene terephthalate (PET), for example. The base material 111 can have a thickness (in Y direction) of 100 µm, for example, and can have a width (in X direction) of 300 mm, for example.

Figure 4:
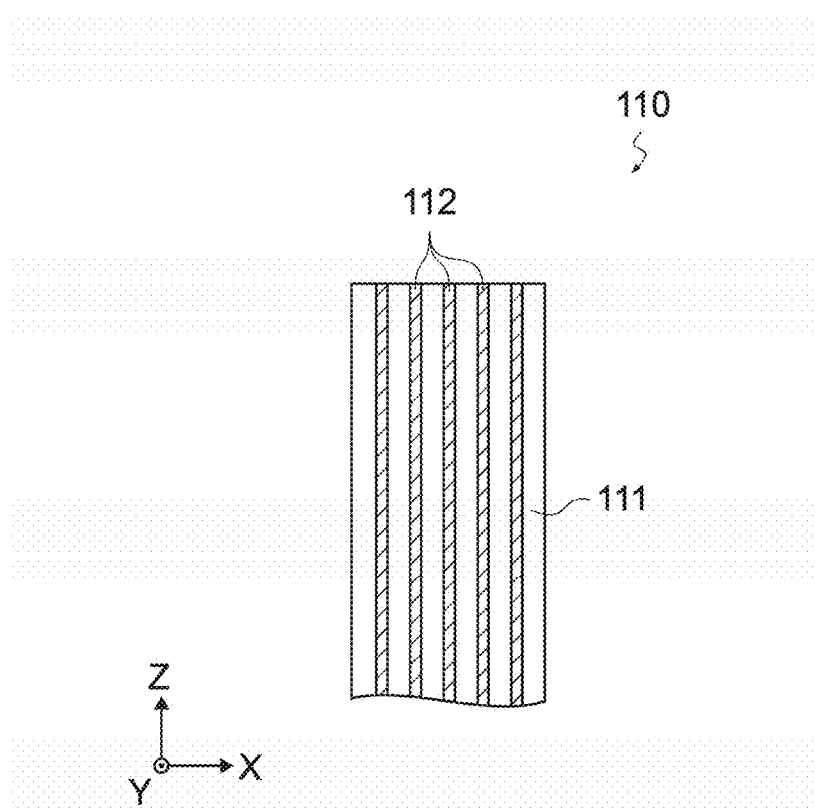
FIG. 4 A plan view of the optical waveguide sheet.

The cores 112 are disposed on the base material 111. FIG. 4 is a plan view showing the cores 112, from which the illustration of the cladding 113 is omitted. As shown in the figure, the plurality of cores 112 each extend in the Z direction and are spaced apart from one another in a direction (X direction) orthogonal to the extending direction (Z direction).

Note that the shape of the cores 112 shown here is simplified. A detailed shape of the core 112 will be described later.

The core 112 is formed of a material having a high light permeability and having a refractive index higher than that of the base material 111 and the cladding 113. For example, ultraviolet curable resin can be used as the material of the core 112. The diameter of the core 112 can have a width (in X direction) and a height (in Y direction) of 50 µm, for example. The intervals (in X direction) of the cores 112 can be 125 µm, for example. The number of cores 112 is not limited to that shown in the figure, and can be one to several hundreds of cores 112.

The cladding 113 is disposed on the base material 111 and the cores 112. For example, ultraviolet curable resin having a refractive index lower than that of the core 112 can be used as the material of the cladding 113. The cladding 113 can have a thickness (in Y direction) of 100 µm, for example.

The optical waveguide sheet 110 has the configuration as described above. The cores 112 are coated with the base material 111 and the cladding 113, and light entering the cores 112 is transmitted while reflected on interfaces between the cores 112 and the base material 111 or interfaces between the cores 112 and the cladding 113. Thus, the cores 112 function as optical waveguides.

Although the dimensions of the optical waveguide sheet 110 are not particularly limited, the optical waveguide sheet 110 can have a width (in X direction) of 10 mm and a length (in Z direction) of 80 mm, for example.

The optical connector 120 connects the optical waveguide sheet 110 to the connection target object 130 (see FIG. 2). The optical connector 120 can be made of synthetic resin and the like having a high light permeability. As shown in FIGS. 1 and 2, the optical connector 120 includes positioning holes 120a and lenses 121.

The plurality of positioning holes 120a are provided in the optical connector 120 and position the optical connector 120 with respect to the connection target object 130 by positioning pins of the connection target object 130 being inserted therein. Further, the positioning holes 120a are also used for joining the optical waveguide sheet 110 with the optical connector 120.

The plurality of lenses 121 are provided in a surface on a side opposed to the connection target object 130. The plurality of lenses 121 are opposed to photoelectric conversion elements 131 of the connection target object 130. The plurality of lenses 121 are arranged in the X direction. The number of lenses 121 may be equal to the number of cores 112 or may be smaller than the number of cores 112. There is a possibility that the cores 112 positioned near the outer periphery of the base material 111 have an unstable shape. Therefore, several (e.g., five) cores 112 positioned near the outer periphery can be set to be dummies and the lenses 121 can be set not to be provided in the dummy cores 112. The lenses 121 are collimating lenses that collimate incident light, for example.

The plurality of photoelectric conversion elements 131 are arranged in the X direction as in the lenses 121. The photoelectric conversion elements 131 are respectively opposed to the lenses 121. The photoelectric conversion elements 131 can be light-emitting elements, light-receiving elements, or light-emitting and light-receiving elements. Note that the configuration of the connection target object 130 is not particularly limited. For example, the optical connector 120 can be connected to an optical function element that is installed on the organic substrate and emits or receives collimated light, an optical connector that is installed on the organic substrate and emits or receives collimated light, a photoelectric conversion element, an optical function element, or an optical connector that is installed on a weak base material like the organic substrate and emits or receives collimated light, or the like. Further, the optical connector 120 may be connected to another optical connector 120.

As shown in FIG. 2, the optical waveguide sheet 110 is joined with the optical connectors 120 and constitutes the optical transmission module 100. The optical waveguide sheet 110 is provided with reflection surfaces 115.

The reflection surfaces 115 are surfaces inclined with respect to the Z direction as shown in the figure and are surfaces having a light reflectance. The reflection surfaces 115 may be cut surfaces obtained by cutting the cladding 113 and the cores 112 by laser machining and the like or may be surfaces formed by embedding light reflection members made of metal and the like in the optical waveguide sheet 110.

[Operation of Optical Transmission Module]

An operation of the optical transmission module 100 will be described. As described above, the photoelectric conversion elements 131 function as light-emitting elements or light-receiving elements.

In a case where the photoelectric conversion elements 131 (see FIG. 2) are light-emitting elements, when electrical signals are input into the photoelectric conversion elements 131, the photoelectric conversion elements 131 convert the electrical signals into optical signals and emit light. The light emitted from the photoelectric conversion elements 131 is concentrated by the lenses 121. The concentrated light is reflected by the reflection surfaces 115, enters the cores 112, and is transmitted.

As described above, the plurality of photoelectric change elements 132 and the plurality of lenses 121 are arranged in the X direction. Emitted light of each photoelectric conversion element 131 enters each core 112 via the lens 121 to which each photoelectric conversion element 131 is opposed, and is transmitted.

In a case where the photoelectric conversion elements 131 (see FIG. 2) are light-receiving elements, light travelling through the cores 112 is reflected by the reflection surfaces 115 and concentrated by the lenses 121. The concentrated light enters the photoelectric conversion elements 131 and the photoelectric conversion elements 131 convert the optical signals into electrical signals.

As described above, the plurality of photoelectric change elements 132 and the plurality of lenses 121 are arranged in the X direction. Emitted light of each core 112 is concentrated via each lens 121 and enters the photoelectric conversion element 131 opposed to the lens 121.

The optical transmission module 100 has the configuration as described above. Note that the configuration of the optical transmission module 100 is an example of the optical transmission module using the optical waveguide sheet 110, and it is also possible to connect the optical waveguide sheet 110 according to the present technology to an optical connector having another configuration. For example, the optical axis directions of light entering the cores 112 and light emitted from the cores 112 do not need to be the Y direction as described above, and may be the Z direction.

[Regarding Core Shape]

Figure 5:
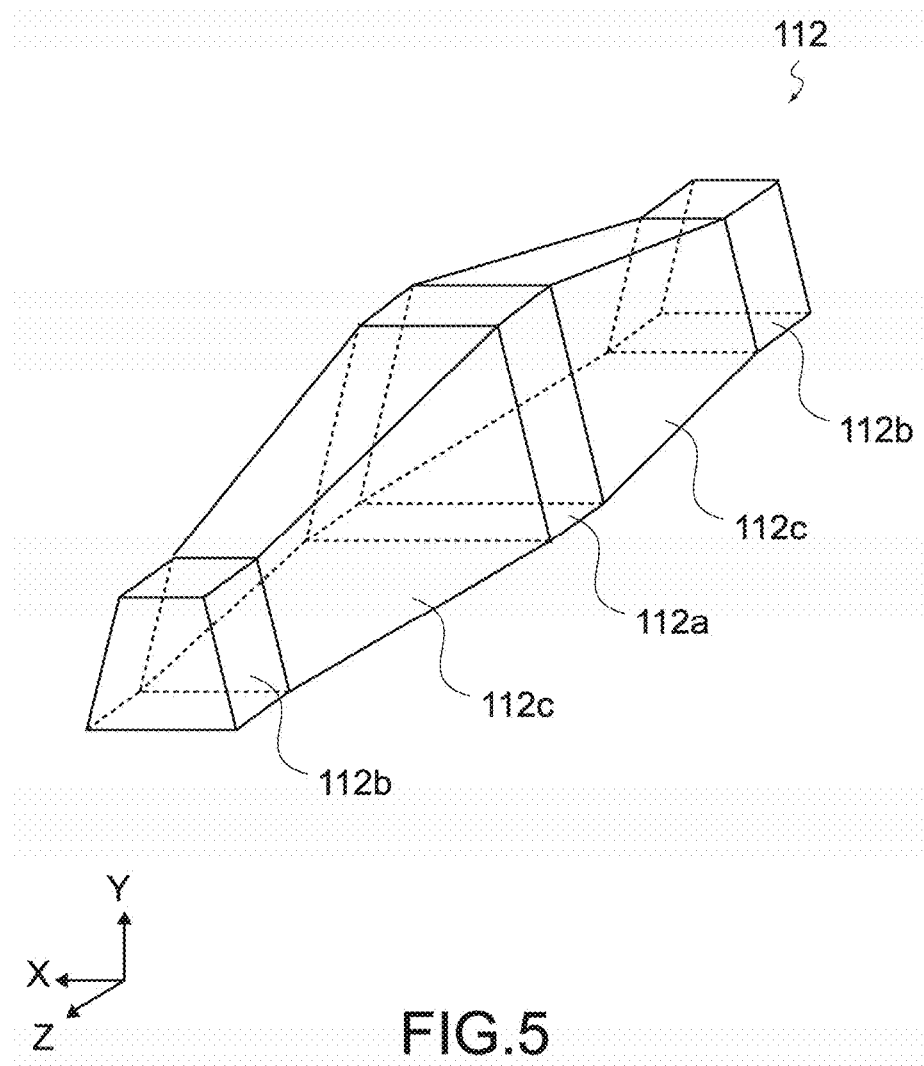
FIG. 5 A perspective view of a core of the optical waveguide sheet.
Figure 6:
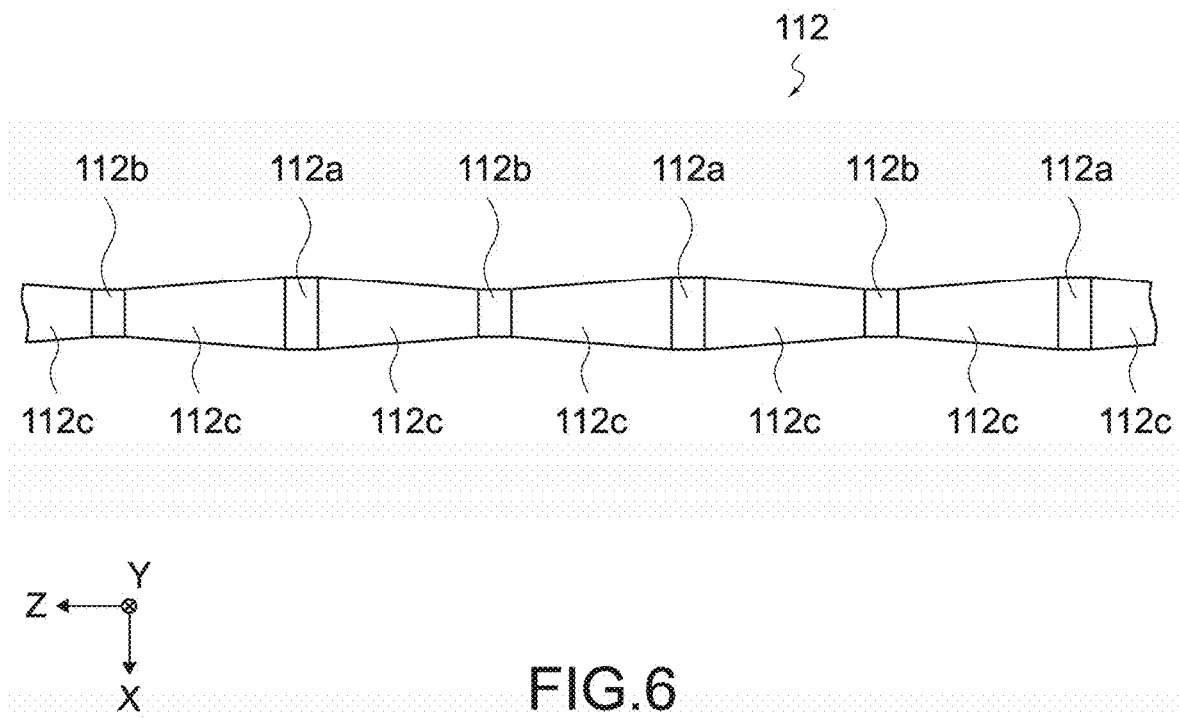
FIG. 6 A plan view of the core of the optical waveguide sheet.
Figure 7:
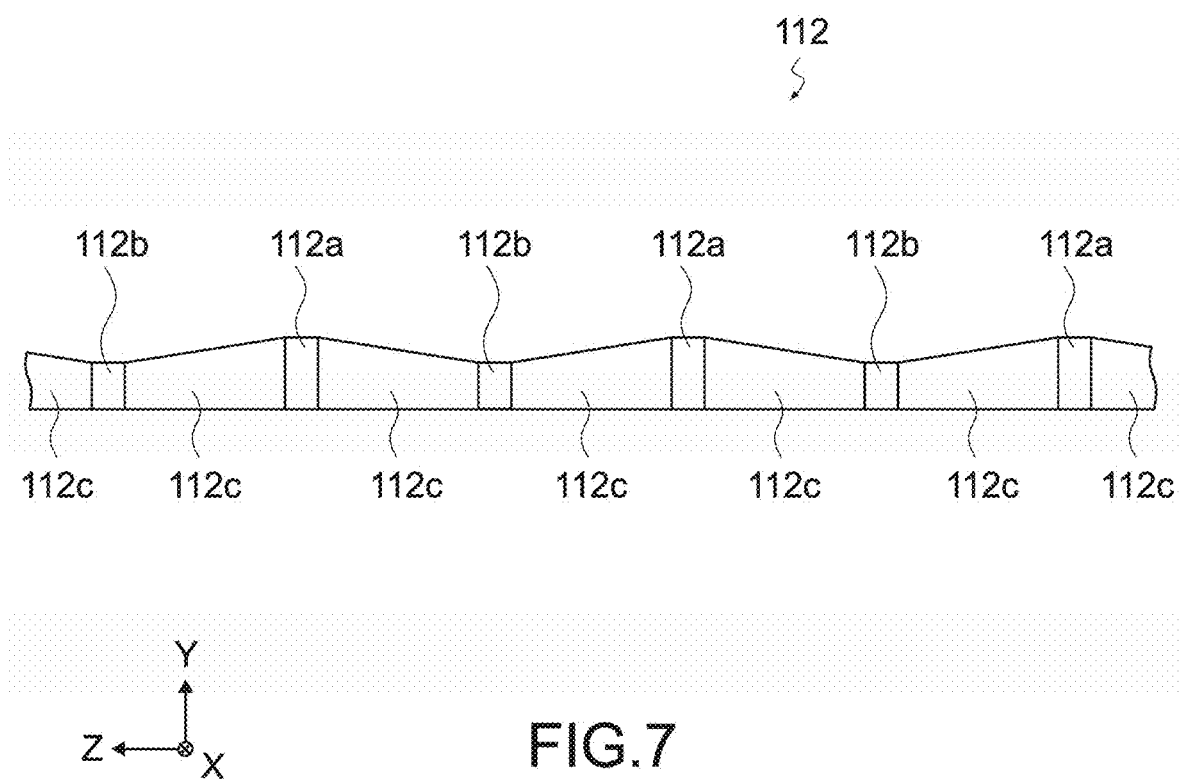
FIG. 7 A plan view of the core of the optical waveguide sheet.

The detailed shape of the core 112 of the optical waveguide sheet 110 will be described. FIG. 5 is a perspective view of a part of the core 112. FIG. 6 is a plan view of the core 112 as viewed in the Y direction. FIG. 7 is a plan view of the core 112 as viewed in the X direction.

As shown in these figures, the core 112 includes maximum diameter portions 112a, minimum diameter portions 112b, and taper portions 112c.

Figure 8:
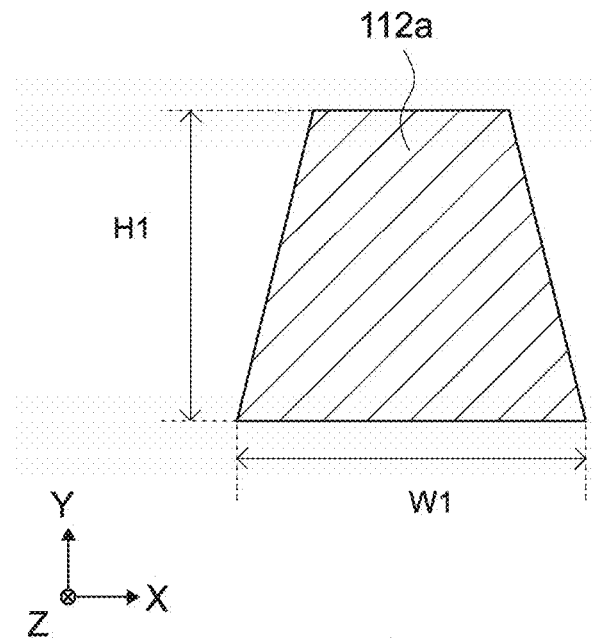
FIG. 8 A cross-sectional view of a maximum diameter portion of the core of the optical waveguide sheet.

The maximum diameter portion 112a is a portion of the core 112 whose cross-sectional area in the X-Y plane is maximum. The maximum diameter portion 112a has a fixed length in the X direction. FIG. 8 is a cross-sectional view of the maximum diameter portion 112a, which is taken along the X-Y plane. As shown in the figure, the cross-section of the maximum diameter portion 112a can have a trapezoidal shape. The width (in X direction) of the maximum diameter portion 112a is denoted by a width W1 and the height (in Y direction) of the maximum diameter portion 112a is denoted by a height H1.

Figure 9:
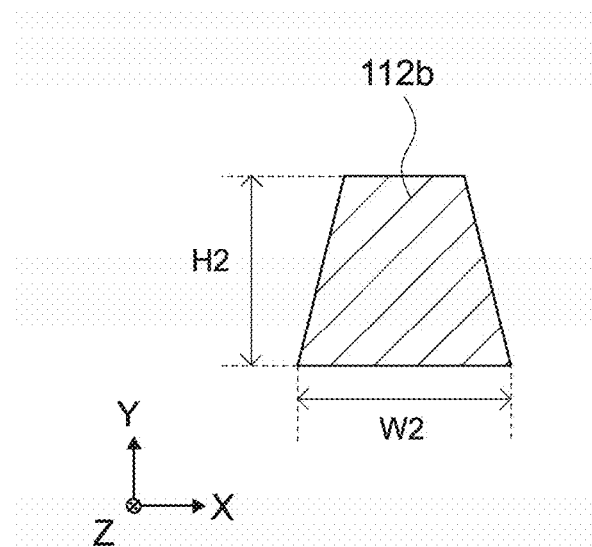
FIG. 9 A cross-sectional view of a minimum diameter portion of the core of the optical waveguide sheet.

The minimum diameter portion 112b is a portion of the core 112 whose cross-sectional area in the X-Y plane is minimum. The minimum diameter portion 112b has a fixed length in the X direction. FIG. 9 is a cross-sectional view of the minimum diameter portion 112b, which is taken along the X-Y plane. As shown in the figure, the cross-section of the minimum diameter portion 112b can have a trapezoidal shape. The width (in X direction) of the minimum diameter portion 112b is denoted by a width W2 and the height (in Y direction) of the minimum diameter portion 112b is denoted by a height H2.

The cross-sections of the maximum diameter portion 112a and the minimum diameter portion 112b can have a similar shape, and the width W1 is larger than the width W2 and the height H1 is larger than the height H2. Further, the cross-sections of the maximum diameter portion 112a and the minimum diameter portion 112b do not need to have a similar shape.

The taper portion 112c is a tapered portion provided between the maximum diameter portion 112a and the minimum diameter portion 112b. The taper portion 112c has the width W1 and the height H1 at a position adjacent to the maximum diameter portion 112a and has a shape identical to that of the cross-section of the maximum diameter portion 112a. Further, the taper portion 112c has the width W2 and the height H2 at a position adjacent to the minimum diameter portion 112b and has a shape identical to that of the minimum diameter portion 112b. That is, the taper portion 112c is continuous with the maximum diameter portion 112a and the minimum diameter portion 112b.

Figure 10:
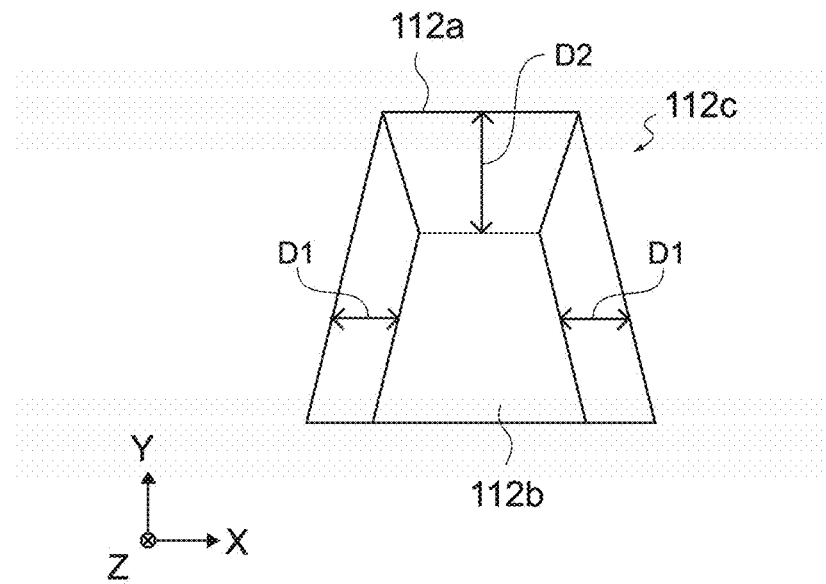
FIG. 10 A plan view of a taper portion of the core of the optical waveguide sheet.

FIG. 10 is a view of the taper portion 112c as viewed in the Z direction. As shown in the figure, the taper portion 112c has such a shape that the width (in the figure, D1) in the X direction gradually increases and the height (in the figure, D2) in the Y direction gradually increases from the minimum diameter portion 112b to the maximum diameter portion 112a.

Further, as viewed from the maximum diameter portion 112a, the taper portion 112c has such a shape that the width (in the figure, D1) in the X direction gradually decreases and the height (in the figure, D2) in the Y direction gradually decreases from the maximum diameter portion 112a to the minimum diameter portion 112b.

In this manner, the taper portion 112c has a two-dimensional taper shape such that the widths in both directions of the X direction and the Y direction gradually change in the Z direction. Note that the two-dimensional taper shape means that it is consequently two-dimensionally tapered between the maximum diameter portion 112a and the minimum diameter portion 112b which are adjacent to each other. That is, the taper portion 112c may include a portion whose width in the X direction gradually changes in the Z direction and a portion whose width in the Y direction gradually changes in the Z direction between the maximum diameter portion 112a and the minimum diameter portion 112b which are adjacent to each other.

As shown in FIGS. 6 and 7, the core 112 has a periodic structure in which the plurality of maximum diameter portions 112a and the plurality of minimum diameter portions 112b are alternately positioned in the Z direction and each of the taper portions 112c is positioned between the maximum diameter portion 112a and the minimum diameter portion 112b.

Further, the optical waveguide sheet 110 may include one maximum diameter portion 112a, one taper portion 112c, and one minimum diameter portion 112b.

[Regarding Effects of Core Shape]

Figure 11:
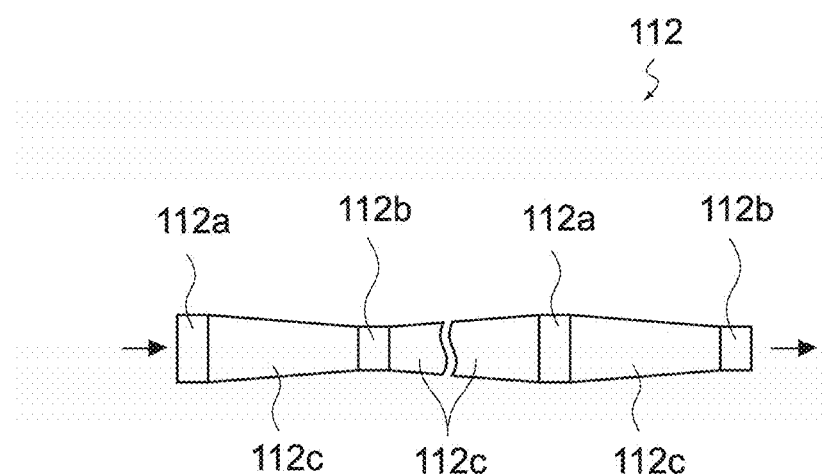
FIG. 11 A schematic view of light entering the core of the optical waveguide sheet and light emitted from the core.

Effects of the shape of the core 112 will be described. FIG. 11 is a schematic view showing the core 112 and light (in the figure, the arrow) entering the core 112.

As shown in the figure, the core 112 can use the maximum diameter portions 112a as light incident surfaces and the minimum diameter portions 112b as light-emitting surfaces. Specifically, by providing the reflection surfaces 115 as shown in FIG. 2 in the maximum diameter portions 112a and the minimum diameter portions 112b, it is possible to use the maximum diameter portions 112a as the light incident surfaces and the minimum diameter portions 112b as the light-emitting surfaces.

Further, by cutting the maximum diameter portions 112a and the minimum diameter portions 112b along the X-Y plane and providing lenses in the cut sections, it is also possible to use the maximum diameter portions 112a as the light incident surfaces and the minimum diameter portions 112b as the light-emitting surfaces.

With this configuration, light emitted from the photoelectric conversion elements 131 (see FIG. 2) is concentrated via the lenses 121 and enters the maximum diameter portions 112a. The maximum diameter portions 112a have a large cross-sectional area, and thus vignetting and leakage of incident light is small and the optical coupling loss of the photoelectric conversion elements 131 and the cores 112 can be reduced.

Further, light travelling through the cores 112 is emitted from the minimum diameter portions 112b and enters the photoelectric conversion elements 131 via the lenses 121. The minimum diameter portions 112b have a small cross-sectional area, and thus the light source size in light emission becomes smaller. Thus, the spot size of concentrated light on a counterpart side can be made also smaller. Therefore, vignetting and leakage of incident light on the counterpart side is small and the optical coupling loss of the cores 112 and the photoelectric conversion elements 131 can be reduced.

Figure 12:
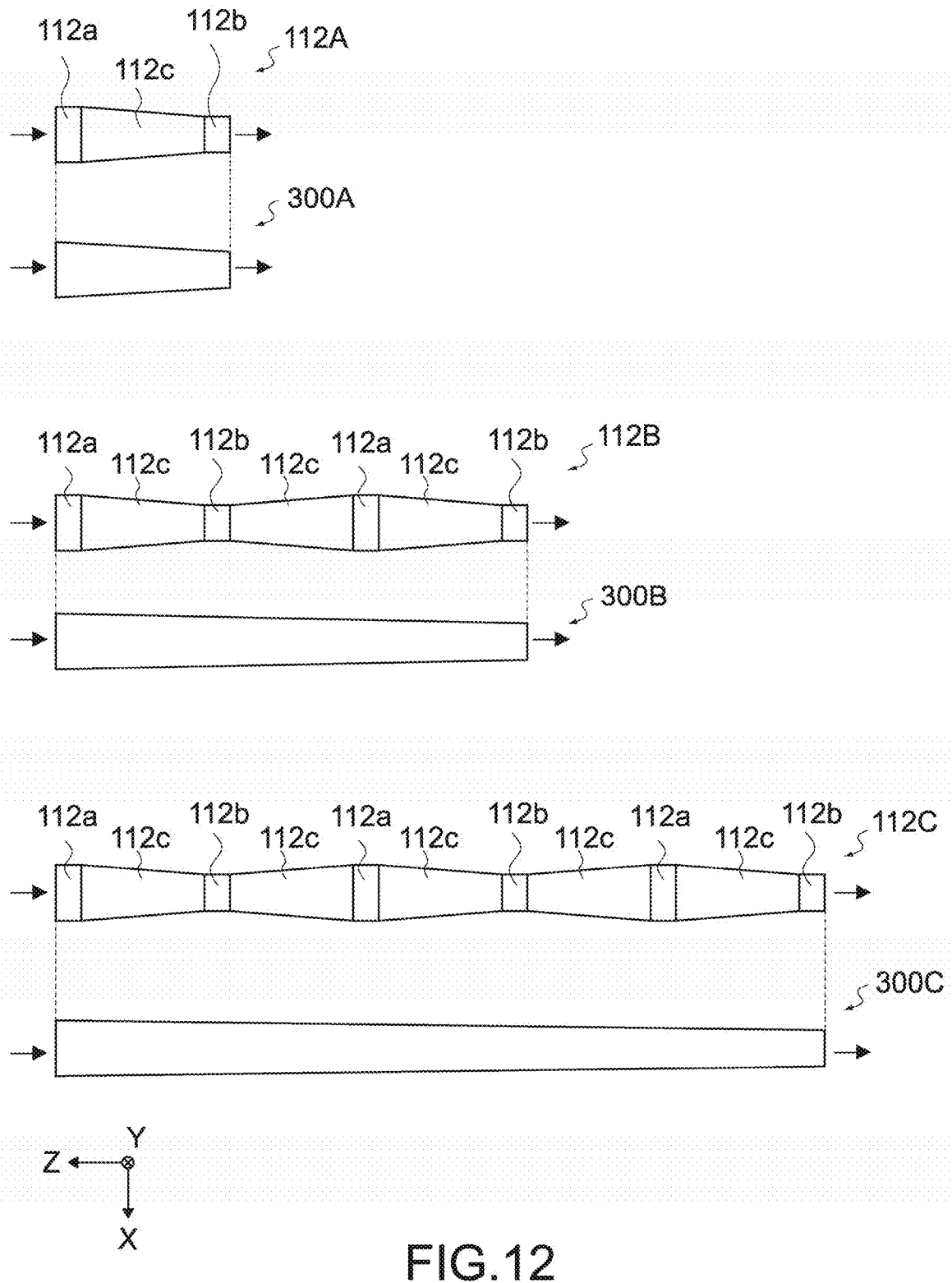
FIG. 12 A schematic view showing a periodic structure of cores of the optical waveguide sheet.

FIG. 12 is a schematic view of cores 112 and cores 300. In FIG. 12, a core 112 including one taper portion 112c is shown as a core 112A and a core 112 including three taper portions 112c is shown as a core 112B. Further, a core 112 including five taper portions 112c is shown as a core 112C.

The core 300 is a core having a two-dimensional taper shape having a maximum diameter equal to that of the maximum diameter portion 112a of the core 112 and a minimum diameter equal to that of the minimum diameter portion 112b of the core 112. A core 300 having the same length as the core 112A is shown as a core 300A and a core 300 having the same length as the core 112B is shown as a core 300B. Further, a core 300 having the same length as the core 112C is shown as a core 300C.

Regarding the core 112A and the core 300A, the light incident surfaces have the same surface area and the light-emitting surfaces have the same surface area, and thus the optical coupling loss of the both cores is equivalent. The core 112B and the core 300B have equivalent optical coupling loss and the core 112C and the core 300C have equivalent optical coupling loss.

However, the core 300A, the core 300B, and the core 300C have different lengths (in Z direction), and thus angles of taper inclination of the respective cores (degrees of change of the cross-sectional area with respect to the Z direction) are different. Therefore, it is impossible to fabricate respective cores by cutting cores having an identical shape. Thus, it is necessary to fabricate respective cores whose angles of taper inclination are different in a manner that depends on lengths.

In contrast, the core 112A, the core 112B, and the core 112C each have the periodic structure as described above. Therefore, by fabricating a sufficiently long core and cutting it at arbitrary positions, it is possible to fabricate all cores of the core 112A, the core 112B, and the core 112C.

In this manner, the core 112 according to this embodiment has the periodic structure, and thus the optical coupling loss is small and it can have an arbitrary length.

[Regarding Arrangement of Cores]

Figure 13:
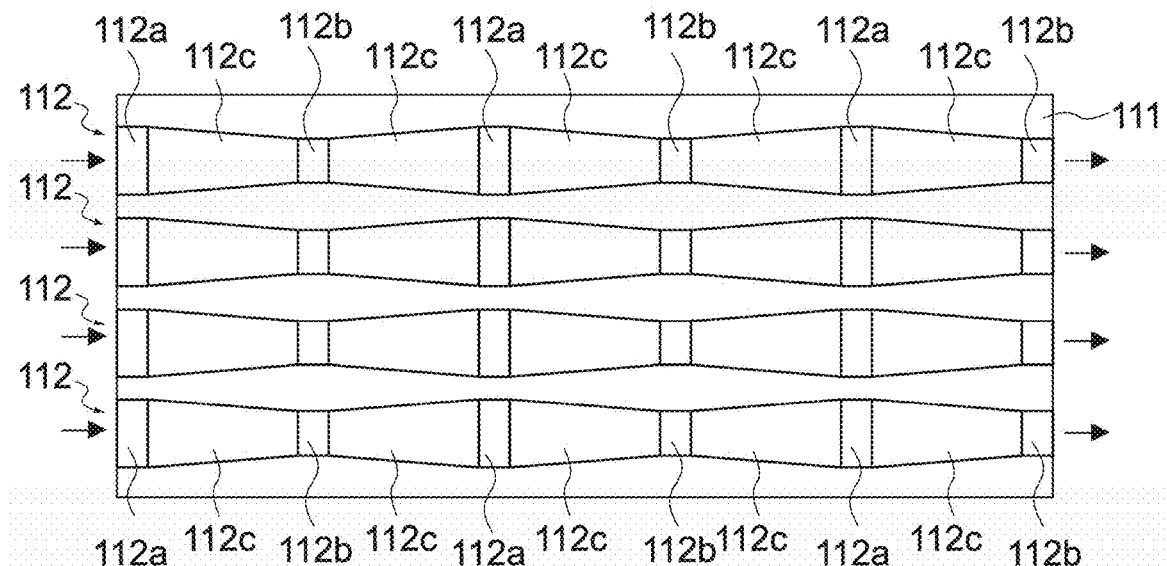
FIG. 13 A schematic view showing an arrangement of cores of the optical waveguide sheet.

As shown in FIG. 3, the optical waveguide sheet 110 includes the plurality of cores 112 arranged in the X direction. FIG. 13 is a plan view showing an arrangement of the cores 112 and light incidence directions (in the figure, the arrows). Note that the illustration of the cladding 113 is omitted from FIG. 13. As shown in the figure, the plurality of cores 112 can be arranged in such a manner that the maximum diameter portions 112a are opposed to each other and the minimum diameter portions 112b are opposed to each other in the X direction between the adjacent cores 112. With this arrangement, the light transmission directions can be set to be the same directions between the plurality of cores 112.

Figure 14:
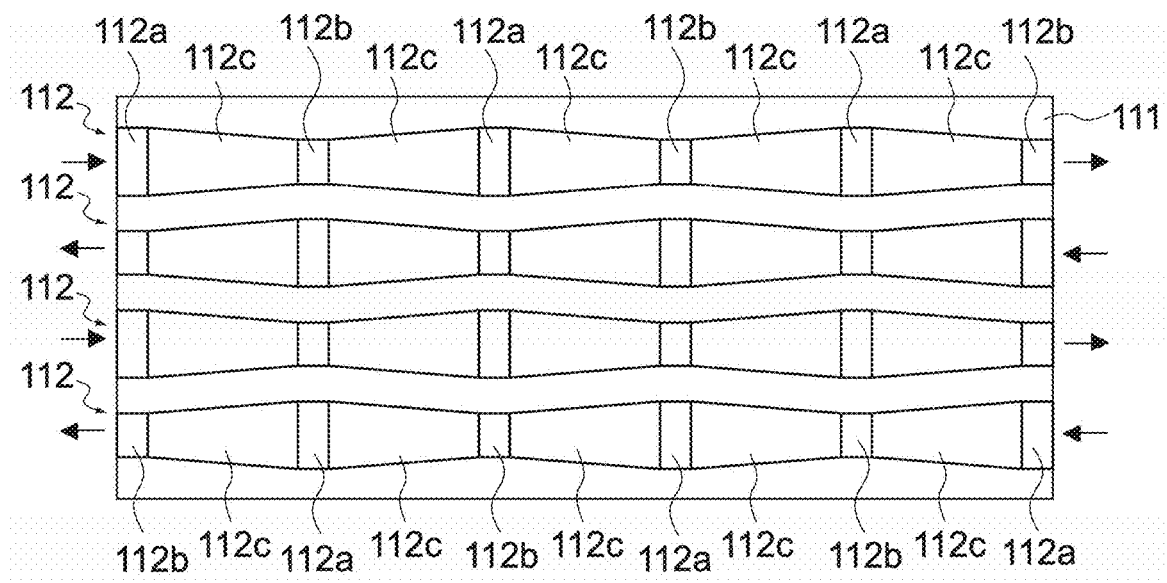
FIG. 14 A schematic view showing an arrangement of cores of the optical waveguide sheet.

FIG. 14 is a plan view showing another arrangement of the cores 112 and light incidence directions (in the figure, the arrows). As shown in the figure, the plurality of cores 112 can be arranged in such a manner that the maximum diameter portions 112a are opposed to the minimum diameter portions 112b in the X direction between the adjacent cores 112. With this arrangement, the light transmission directions can be set to be opposite directions between the adjacent cores 112.

Figure 15:
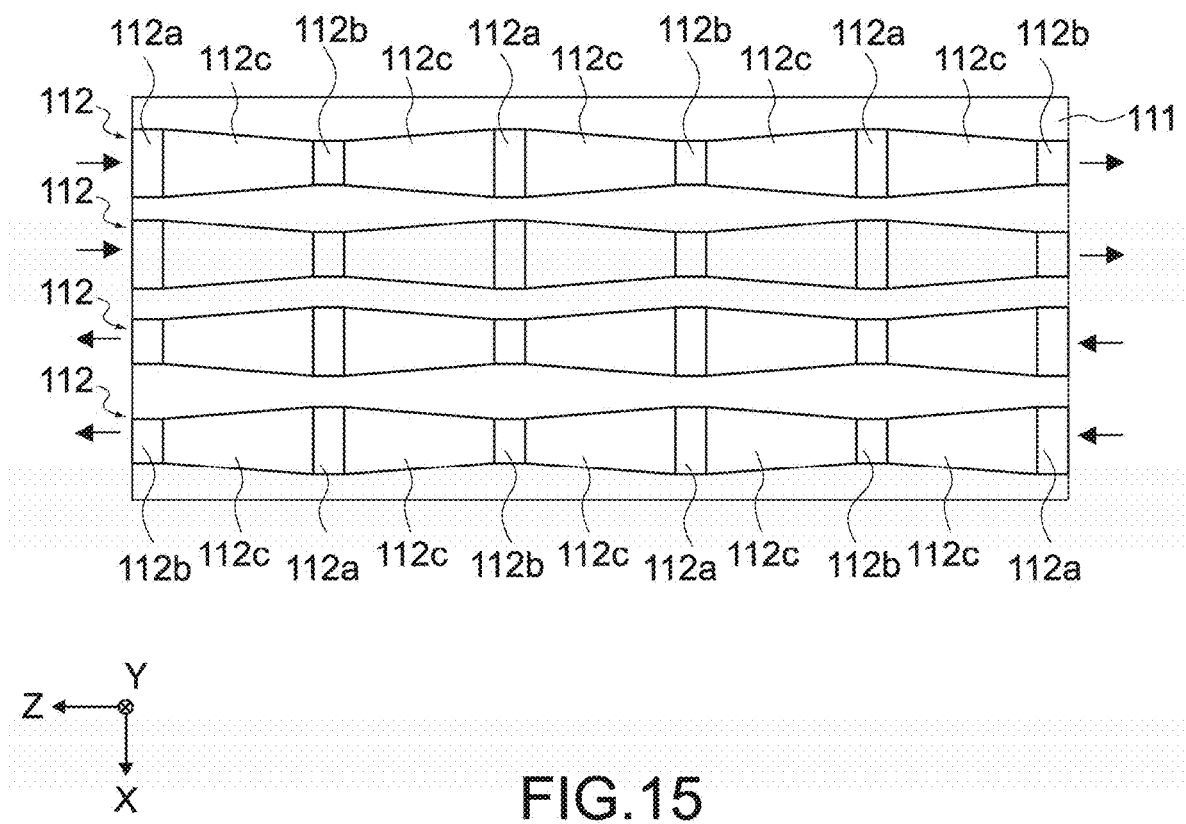
FIG. 15 A schematic view showing an arrangement of cores of the optical waveguide sheet.

FIG. 15 is a plan view showing another arrangement of the cores 112 and light incidence directions (in the figure, the arrows). As shown in the figure, the cores 112 form two core groups. In each of the core groups, the cores are arranged in such a manner that the maximum diameter portions 112a are opposed to each other and the minimum diameter portions 112b are opposed to each other in the X direction. Between the core groups, the cores can be arranged in such a manner that the maximum diameter portions 112a are opposed to the minimum diameter portions 112b in the X direction. With this arrangement, the light transmission directions can be set to be opposite directions between the two core groups. The number of core groups is not limited to two, and the number of cores 112 of each of the core groups is also arbitrary.

[Manufacturing Method for Optical Waveguide Sheet]

Figure 16:
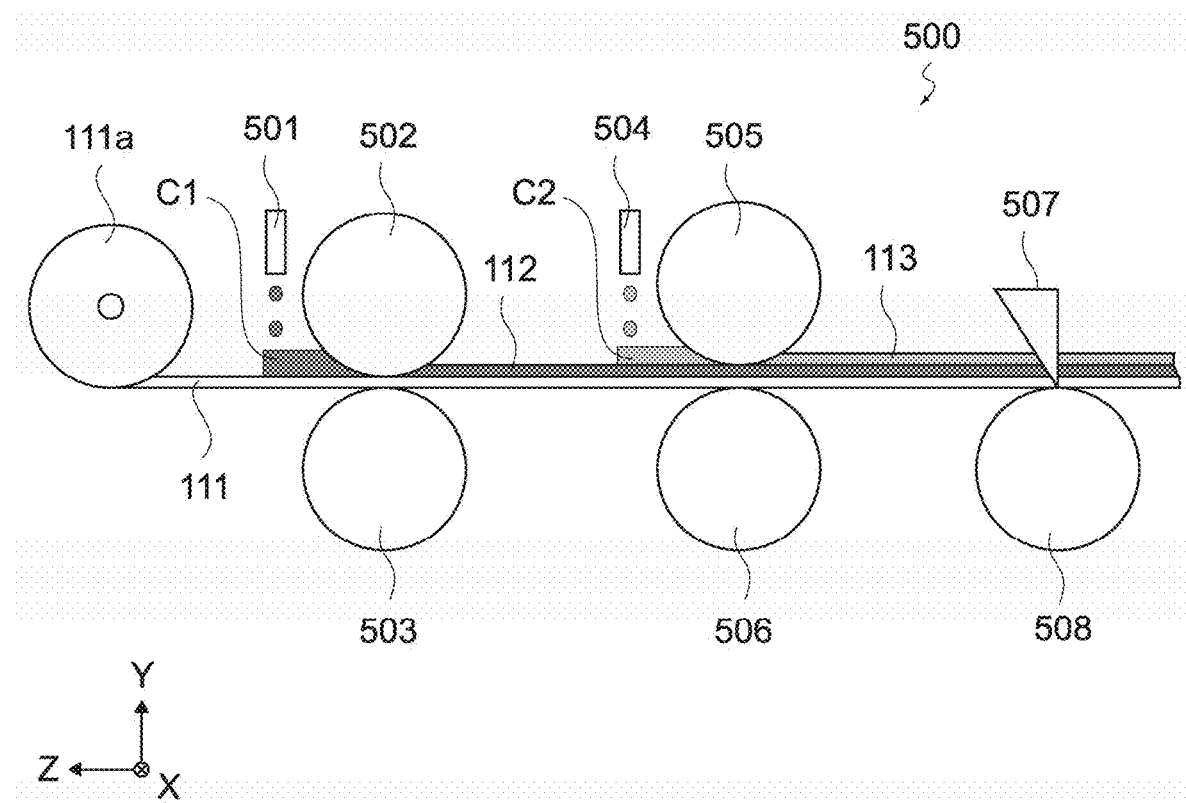
FIG. 16 A schematic view showing a manufacturing method for an optical waveguide sheet.

A manufacturing method for the optical waveguide sheet 110 will be described. FIG. 16 is a schematic view showing the manufacturing method for the optical waveguide sheet 110 and FIGS. 17 to 20 are schematic views of respective manufacturing processes of the optical waveguide sheet 110. As shown in FIG. 16, the optical waveguide sheet 110 can be manufactured by a roll imprint method using a roll imprint apparatus 500.

Figure 17:
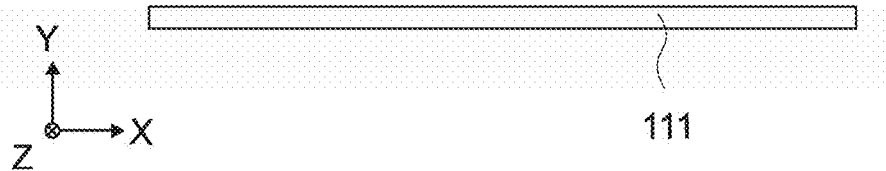
FIG. 17 A schematic view showing manufacturing processes of the optical waveguide sheet.

As shown in the figure, the base material 111 around which a base material roll 111a is wound is set in the roll imprint apparatus 500 and the base material 111 is conveyed from the base material roll 111a. Although the base material 111 can be conveyed in a roll-to-roll process, it may be conveyed by another method. FIG. 17 is a schematic view of the base material 111 pulled out of the base material roll 111a. The base material 111 has a thickness (in Y direction) of 100 µm, for example, and a width (in X direction) of 300 mm, for example.

Figure 21:
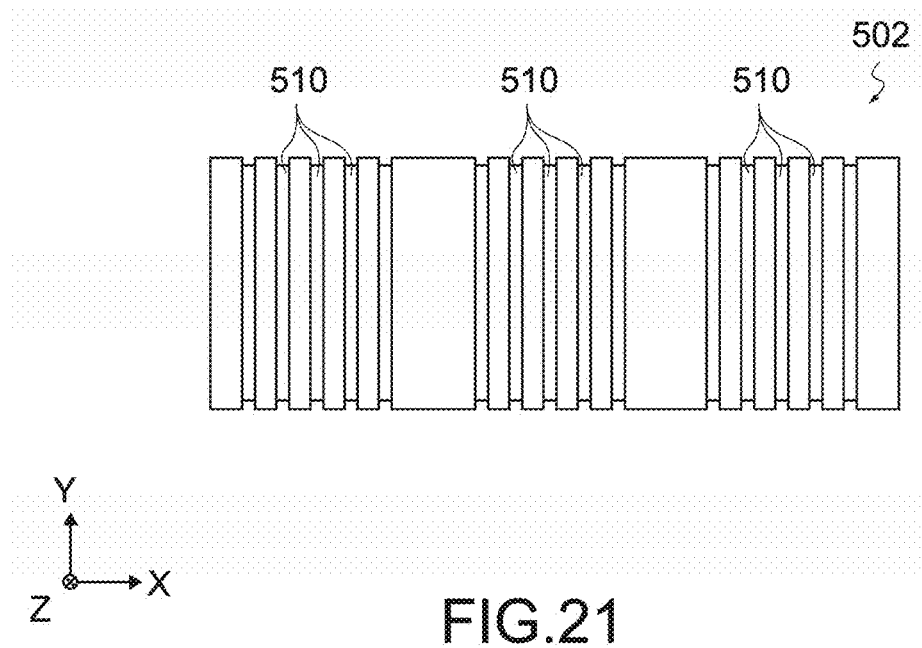
FIG. 21 A schematic view showing a cylindrical transfer roll used in the manufacturing method for an optical waveguide sheet.

Subsequently, a core material C1 is dispensed onto the base material 111 from a core material dispensing section 501 and the core material C1 is applied onto the base material 111. The core material C1 can be ultraviolet curable resin. The core material C1 passes through a gap between a cylindrical transfer roll 502 and the elastic roll 503 together with the base material 111. FIG. 21 is a schematic view of the cylindrical transfer roll 502.

The cylindrical transfer roll 502 is a roll made of metal and the like and has a width (in X direction) of 300 mm, for example, and a diameter of 150 mm, for example. As shown in the figure, a plurality of grooves 510 are formed in the cylindrical transfer roll 502 in a circumferential direction. The number of grooves 510 is actually twenty, for example. A detailed shape of the groove 510 will be described later. The elastic roll 503 is a roll made of an elastic material such as a rubber.

The base material 111 and the core material C1 pass through the gap between the cylindrical transfer roll 502 and the elastic roll 503 and are pressed by the cylindrical transfer roll 502 and the elastic roll 503. By passing through the grooves 510, the shapes of the grooves 510 are transferred to the core material C1 and the core material C1 is formed into the shapes of the cores 112. The core material C1 is irradiated with ultraviolet rays at the same time or immediately after the core material C1 passes through the gap between the cylindrical transfer roll 502 and the elastic roll 503. Thus, the core material C1 is cured and the cores 112 are formed.

Figure 18:
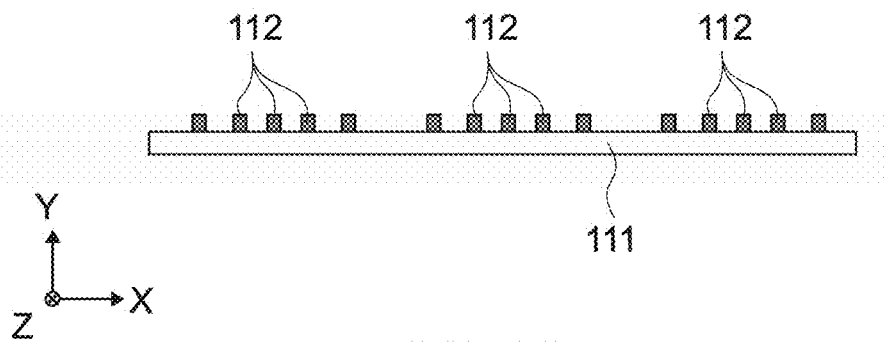
FIG. 18 A schematic view showing the manufacturing processes of the optical waveguide sheet.

FIG. 18 is a schematic view of the base material 111 and the cores 112 after the base material 111 and the cores 112 pass through the gap between the cylindrical transfer roll 502 and the elastic roll 503. The core 112 can have a width (in X direction) and a height (in Y direction) of 50 µm. The intervals (in X direction) of the cores 112 can be 125 µm, for example.

Subsequently, a cladding material C2 is dispensed onto the base material 111 and the cores 112 from a core material dispensing section 504 and the cladding material C2 is applied onto the base material 111 and the cores 112. The cladding material C2 can be ultraviolet curable resin. The cladding material C2 passes through a gap between a press roll 505 and an elastic roll 506 together with the base material 111 and the cores 112. The press roll 505 is a roll made of metal and the like and the elastic roll 506 is a roll made of an elastic material such as a rubber.

The base material 111, the core 112, and the cladding material C2 are pressed by the press roll 505 and the elastic roll 506. The cladding material C2 is made to have a predetermined thickness by pressing or due to a set clearance between the rolls and is formed in the shape of the cladding 113. The cladding material C2 is irradiated with ultraviolet rays at the same time or immediately after the cladding material C2 passes through the gap between the press roll 505 and the elastic roll 506. Thus, the cladding material C2 is cured and the cladding 113 is formed.

Figure 19:
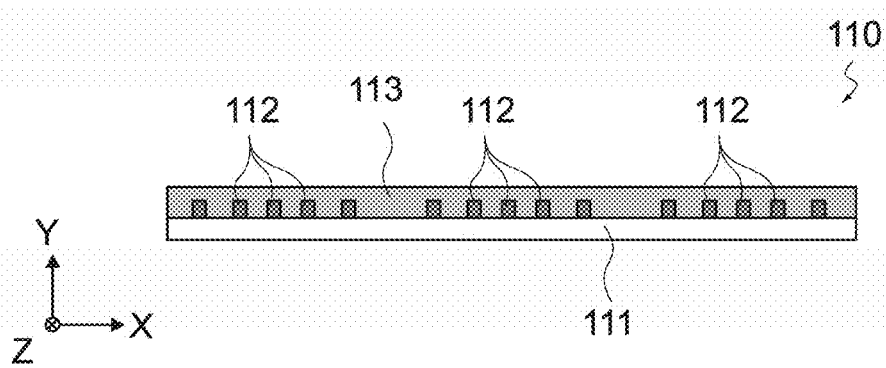
FIG. 19 A schematic view showing the manufacturing processes of the optical waveguide sheet.

FIG. 19 is a schematic view of the base material 111, the core 112, and the cladding 113 after the base material 111, the core 112, and the cladding 113 pass through the gap between the press roll 505 and the elastic roll 506. The cladding 113 can have a thickness (in Y direction) of 100 μm, for example, from the base material 111.

Figure 20:
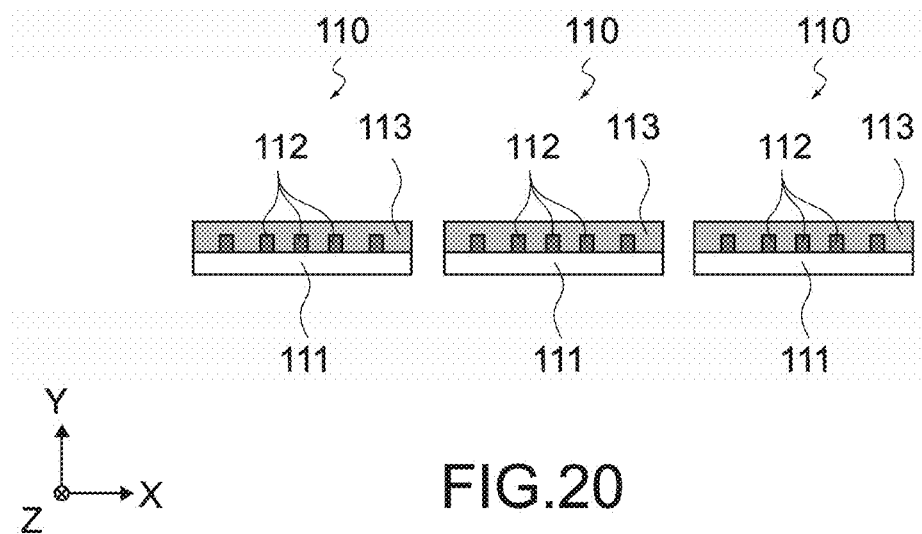
FIG. 20 A schematic view showing the manufacturing processes of the optical waveguide sheet.

Subsequently, the base material 111, the core 112, and the cladding 113 are cut by a cutting mechanism, which is formed by a blade 507 and a roll 508, in the extending direction (Z direction) of the cores 112. Thus, a plurality of optical waveguide sheets 110 are formed. FIG. 20 is a schematic view of the plurality of optical waveguide sheets 110 formed by cutting. Note that, although FIGS. 17 to 20 show manufacturing processes of three optical waveguide sheets 110, a larger number of optical waveguide sheets 110 can be actually manufactured by the identical processes, and, for example, 30 optical waveguide sheets 110 can be manufactured at the same time.

Note that this manufacturing method is an example of the manufacturing method for the optical waveguide sheet 110 and the optical waveguide sheet 110 can also be manufactured by using a method other than the roll imprint method. On the other hand, the roll imprint method is relatively low in manufacture cost and apparatus cost, and the optical waveguide sheet 110 can be manufactured at low cost.

[Regarding Groove Shape]

Figure 22:
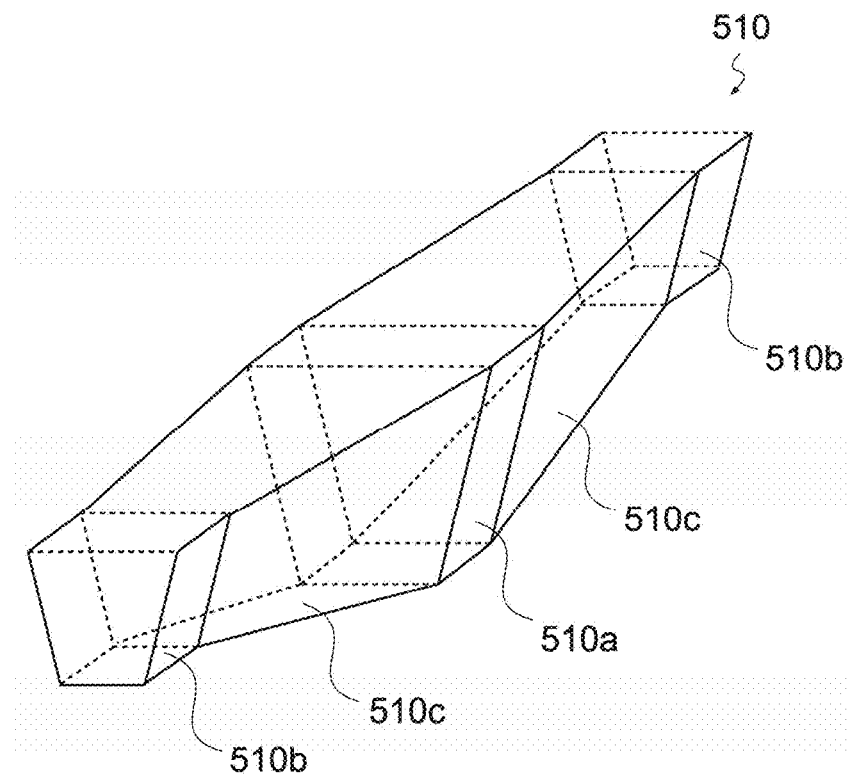
FIG. 22 A perspective view of one of grooves provided in the cylindrical transfer roll used in the manufacturing method for an optical waveguide sheet.
Figure 22:
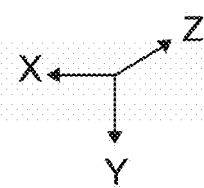
Figure 23:
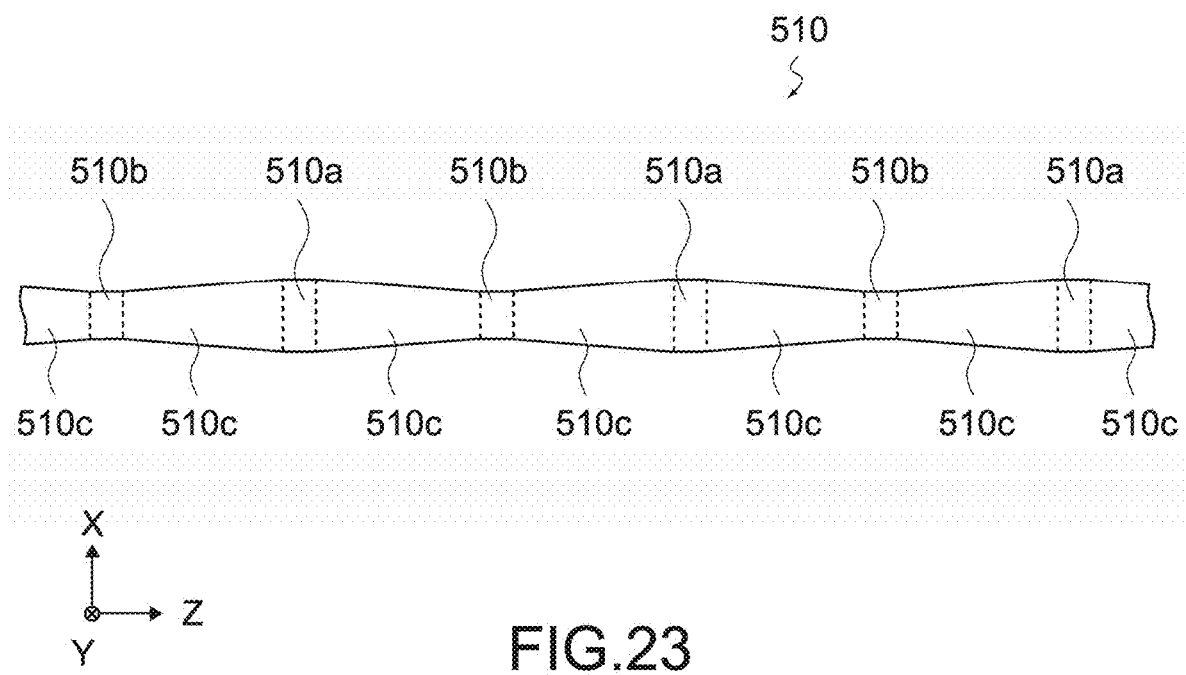
FIG. 23 A plan view of the groove provided in the cylindrical transfer roll used in the manufacturing method for an optical waveguide sheet.
Figure 24:
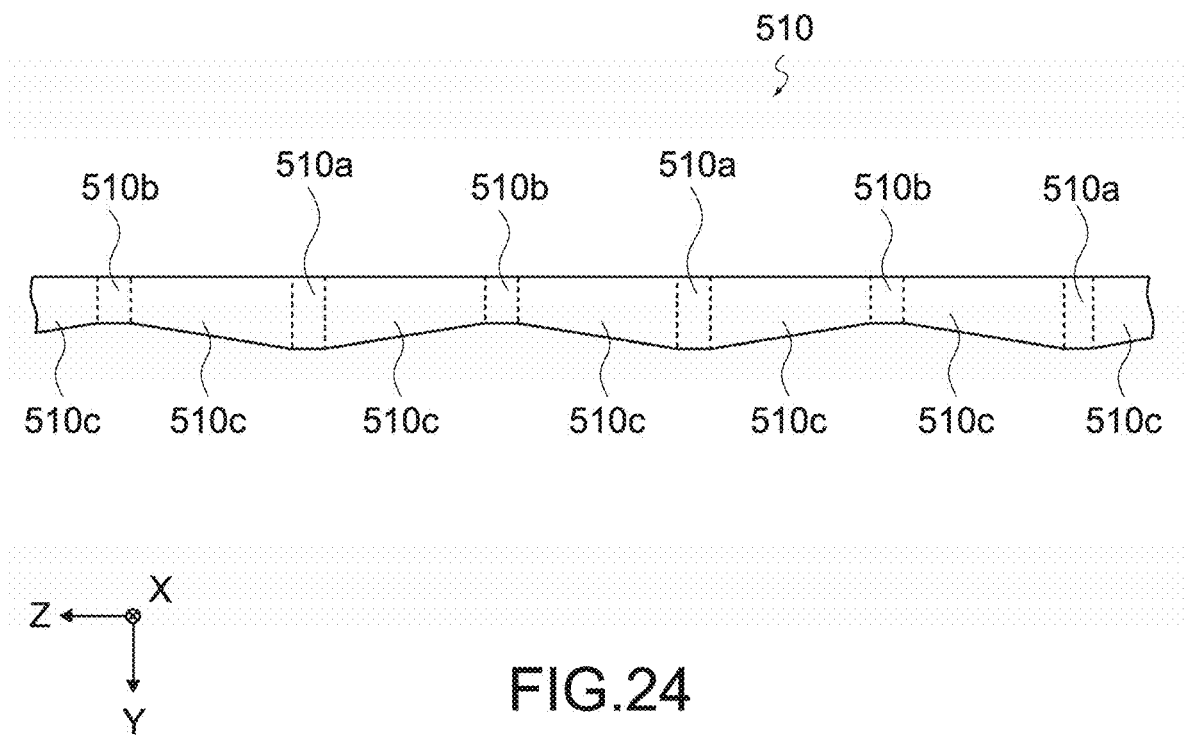
FIG. 24 A plan view of the groove provided in the cylindrical transfer roll used in the manufacturing method for an optical waveguide sheet.

As described above, the cylindrical transfer roll 502 has the grooves 510 formed for forming the shapes of the cores 112. FIG. 22 is a perspective view of one of the grooves 510. FIG. 23 is a plan view of the groove 510 as viewed in the Y direction. FIG. 24 is a plan view of the core 112 as viewed in the X direction. Note that, although the cylindrical transfer roll 502 has a cylindrical shape, FIGS. 21 to 23 are views showing the cylindrical surface of the cylindrical transfer roll 502 as developed in a plane.

As shown in these figures, the groove 510 includes maximum diameter portions 510a, minimum diameter portions 510b, and taper portions 510c.

Figure 25:
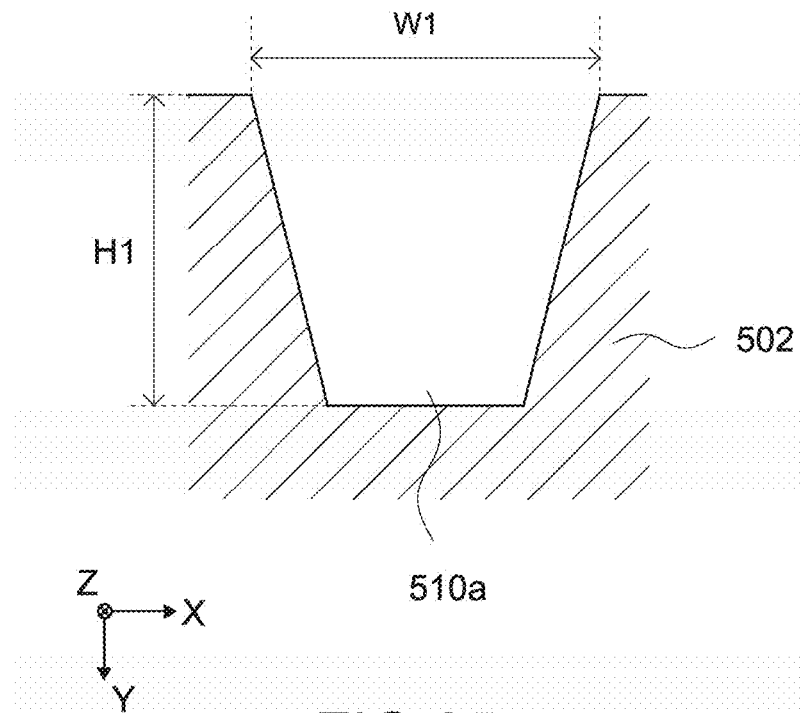
FIG. 25 A cross-sectional view of a maximum diameter portion of the groove provided in the cylindrical transfer roll used in the manufacturing method for an optical waveguide sheet.

The maximum diameter portion 510a is a portion of the groove 510 whose cross-sectional area in the X-Y plane is maximum. FIG. 25 is a cross-sectional view of the maximum diameter portion 510a, which is taken along the X-Y plane. As shown in the figure, the cross-section of the maximum diameter portion 510a can have a trapezoidal shape. The width (in X direction) of the maximum diameter portion 510a is equal to the width W1 of the core 112 and the depth (in Y direction) of the maximum diameter portion 510a is equal to the height H1 of the core 112.

Figure 26:
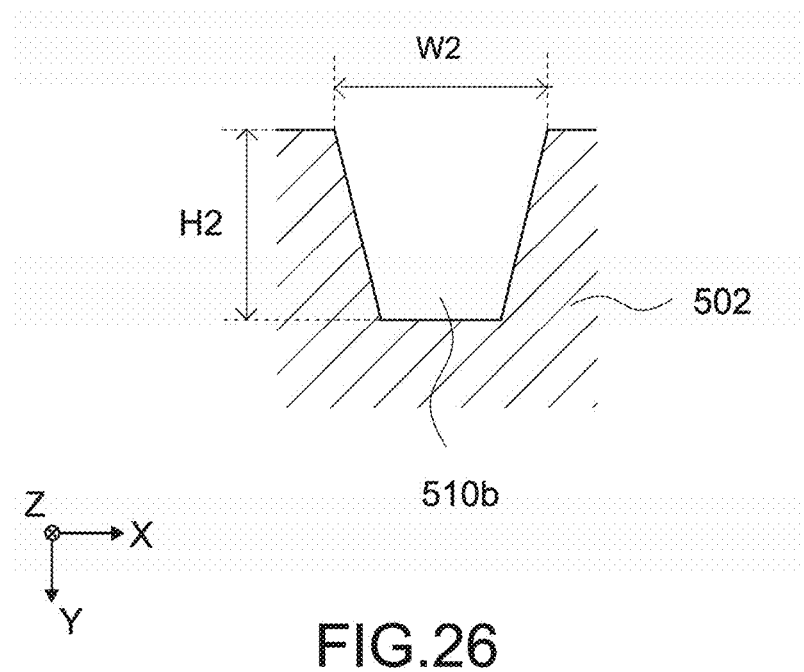
FIG. 26 A cross-sectional view of a minimum diameter portion of the groove provided in the cylindrical transfer roll used in the manufacturing method for an optical waveguide sheet.

The minimum diameter portion 510b is a portion of the groove 510 whose cross-sectional area in the X-Y plane is minimum. FIG. 26 is a cross-sectional view of the minimum diameter portion 510b, which is taken along the X-Y plane. As shown in the figure, the cross-section of the minimum diameter portion 510b can have a trapezoidal shape. The width (in X direction) of the minimum diameter portion 510b is equal to the width W2 of the core 112 and the depth (in Y direction) of the minimum diameter portion 510b is equal to the height H2 of the core 112.

The cross-sections of the maximum diameter portion 510a and the minimum diameter portions 510b can have similar shape and the width W1 is larger than the width W2 and the height H1 is larger than the height H2. Note that the cross-sections of the maximum diameter portion 510a and the minimum diameter portions 510b do not need to have a similar shape.

The taper portion 510c is a tapered portion provided between the maximum diameter portion 510a and the minimum diameter portion 510b. The taper portion 510c has the width W1 and the depth H1 at a position adjacent to the maximum diameter portion 510a and has a shape identical to that of the cross-section of the maximum diameter portion 510a. Further, the taper portion 510c has the width W2 and the depth H2 at a position adjacent to the minimum diameter portion 510b and has a shape identical to that of the cross-section of the minimum diameter portion 510b. That is, the taper portion 510c is continuous with the maximum diameter portion 510a and the minimum diameter portion 510b.

Figure 27:
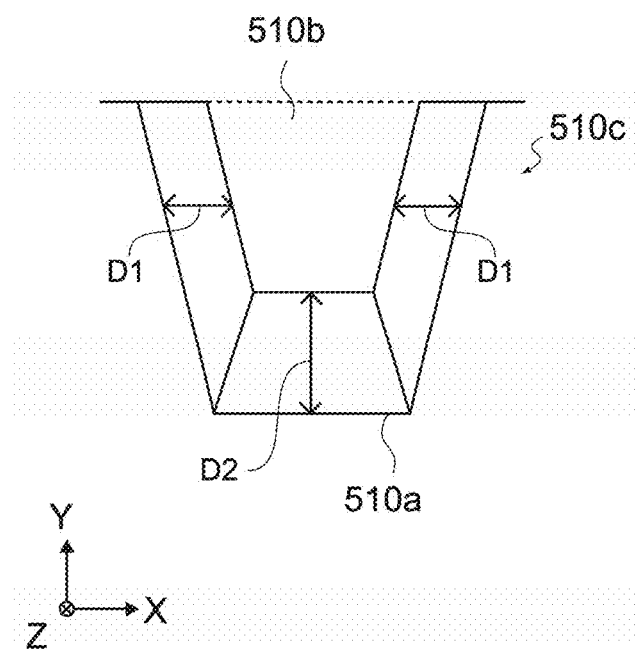
FIG. 27 A schematic view of a taper portion of the groove provided in the cylindrical transfer roll used in the manufacturing method for an optical waveguide sheet.

FIG. 27 is a view of the taper portion 510c as viewed in the Z direction. As shown in the figure, the taper portion 510c has such a shape that the width (in the figure, D1) in the X direction gradually increases and the depth (in the figure, D2) in the Y direction gradually increases from the minimum diameter portion 510b to the maximum diameter portion 510a.

Further, as viewed from the maximum diameter portion 510a, the taper portion 510c has such a shape that the width (in the figure, D1) in the X direction gradually decreases and the depth (in the figure, D2) in the Y direction gradually decreases from the maximum diameter portion 510a to the minimum diameter portion 510b.

In this manner, the taper portion 510c has a two-dimensional taper shape such that the widths in both directions of the X direction and the Y direction gradually change in the Z direction.

As shown in FIGS. 23 and 24, the groove 510 has a periodic structure in which the maximum diameter portions 510a and the minimum diameter portions 510b are alternately positioned in the Z direction and each of the taper portions 510c is positioned between the maximum diameter portion 510a and the minimum diameter portion 510b.

Regarding the groove 510, a structure in which the above-mentioned periodic structure is continuously formed in a circumferential direction of the cylindrical transfer roll 502 is provided. That is, by using the above-mentioned roll imprint method, it is possible to infinitely form the periodic structure of the above-mentioned core 112.

The arrangement of the plurality of grooves 510 in the cylindrical transfer roll 502 can be an arrangement in which the plurality of grooves 510 can form the arrangement of the cores 112 as shown in FIGS. 13 to 15. That is, it is possible to employ an arrangement in which the maximum diameter portions 510a are opposed to each other and the minimum diameter portions 510b are opposed to each other in the X direction or an arrangement in which the maximum diameter portions 510a are opposed to the minimum diameter portions 510b in the X direction.

[Formation Method for Groove]

A formation method for the groove 510 in the cylindrical transfer roll 502 will be described. The groove 510 can be formed in such a manner that cutting machining using a cutting tool is performed on the cylindrical transfer roll 502 that is not machined.

Figure 28:
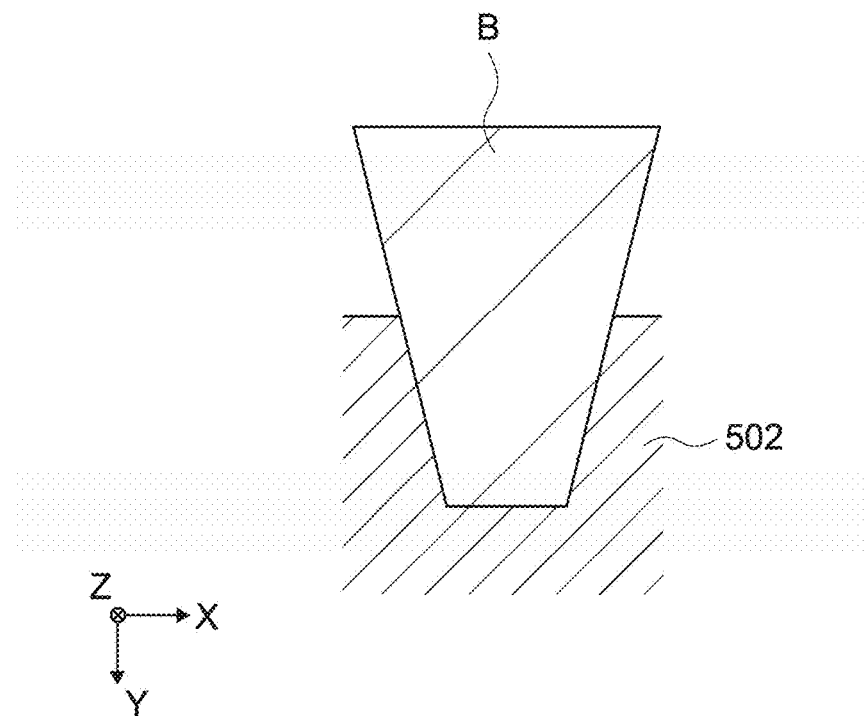
FIG. 28 A schematic view showing a formation method for a groove in the cylindrical transfer roll used in the manufacturing method for an optical waveguide sheet.
Figure 29:
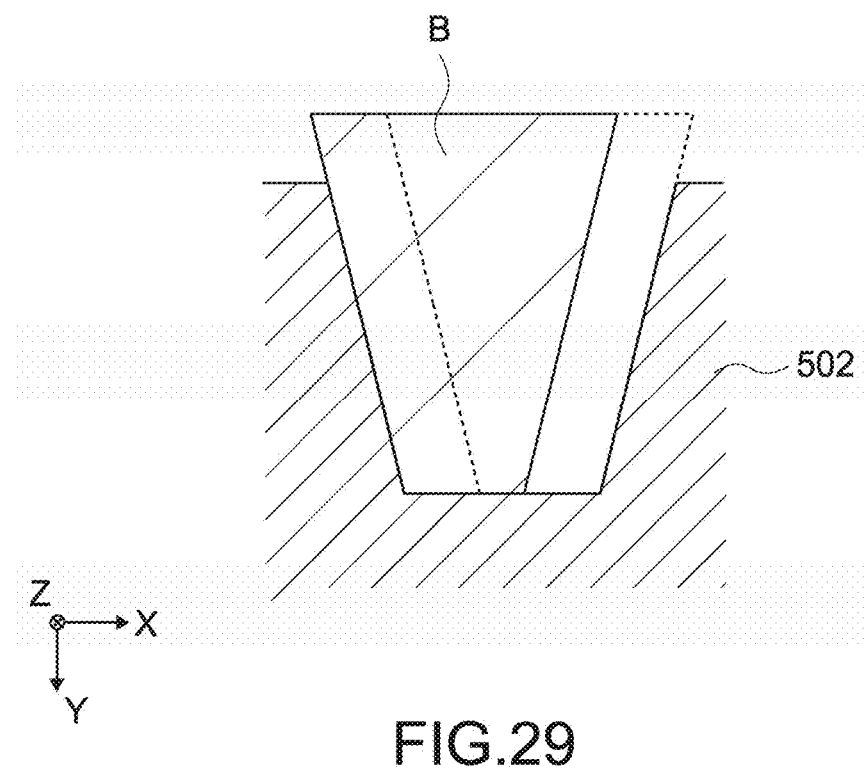
FIG. 29 A schematic view showing the formation method for a groove in the cylindrical transfer roll used in the manufacturing method for an optical waveguide sheet.
Figure 30:
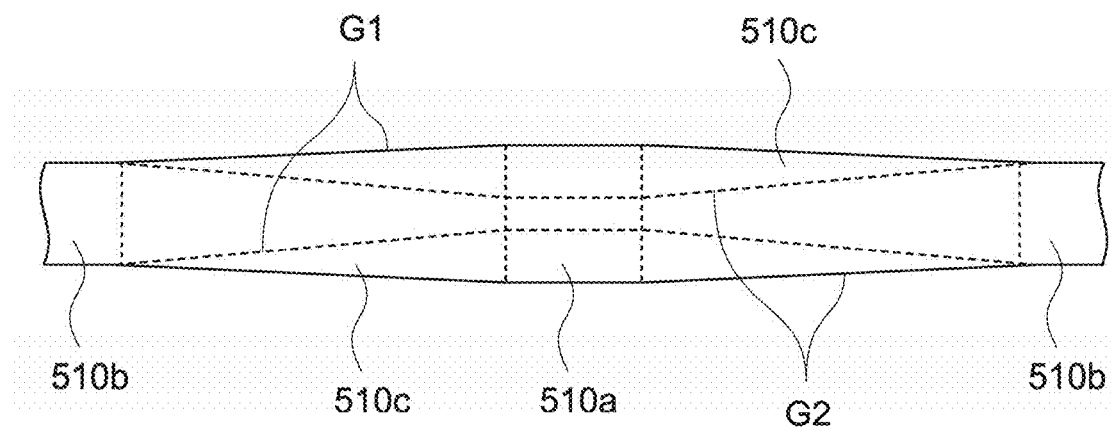
FIG. 30 A schematic view showing the formation method for a groove in the cylindrical transfer roll used in the manufacturing method for an optical waveguide sheet.
Figure 30:
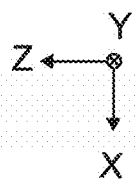

FIG. 28 is a cross-sectional view showing a machining method for the minimum diameter portions 510b. FIG. 29 is a cross-sectional view showing a machining method for the maximum diameter portions 510a. FIG. 30 is a plan view showing the machining method for the grooves 510 and is a development plan of the surface of the cylindrical transfer roll 502.

As shown in FIG. 28, the minimum diameter portion 510b can be formed by inserting the cutting tool B into the cylindrical transfer roll 502 to a fixed depth and performing cutting. Further, as shown in FIG. 29, the maximum diameter portion 510a can be formed by inserting the cutting tool B into the cylindrical transfer roll 502 to a larger depth and performing cutting using the cutting tool B in two routes like a route G1 and a route G2 shown in FIG. 30. That is, the groove 510 can be formed by using one type of cutting tool B.

[Effects of Core Shape in Manufacturing Method]

As described above, the core 112 has the periodic structure, and thus, when it is cut at any arbitrary length, the maximum diameter portions 112a can be used as the light incident surfaces and the minimum diameter portions 112b can be used as the light-emitting surfaces. Further, the cores 112 are formed by using the cylindrical transfer roll 502 in the roll imprint method as described above, and it is possible to form the cores 112 with an infinite length by using the grooves 510 each having the periodic structure.

In contrast, in a case of forming cores having a shape like the shape of the above-mentioned cores 300 by using the roll imprint method, the circumference of the cylindrical transfer roll becomes an upper limit of the length of the taper shape, and thus the cores having the taper shape cannot be formed beyond the fixed length. Therefore, the optical waveguide sheet according to this embodiment is favorable for manufacturing using the roll imprint method.

[Manufacturing Method for Optical Transmission Module]

A manufacturing method for the optical transmission module 100 will be described. FIGS. 31 to 40 are schematic views showing the manufacturing method for the optical transmission module 100.

Figure 31:
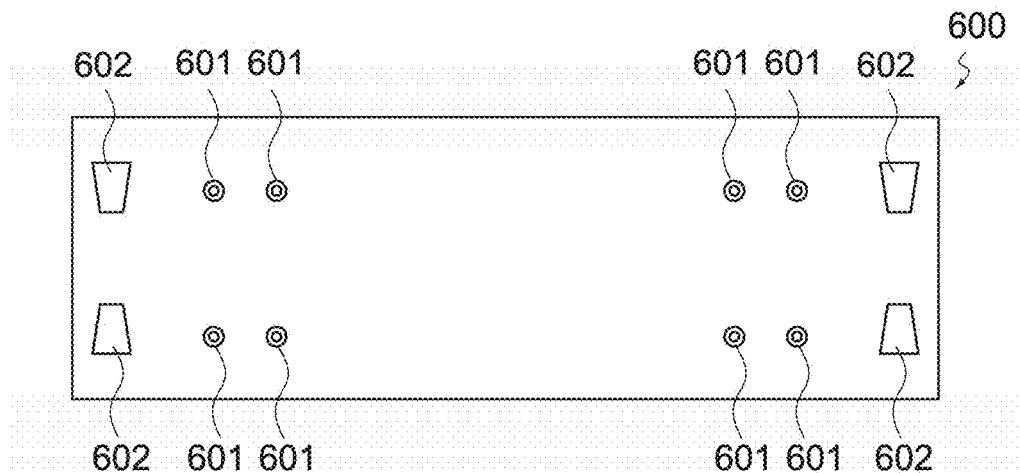
FIG. 31 A schematic view showing manufacturing processes of the optical transmission module according to the embodiment of the present technology.
Figure 32:
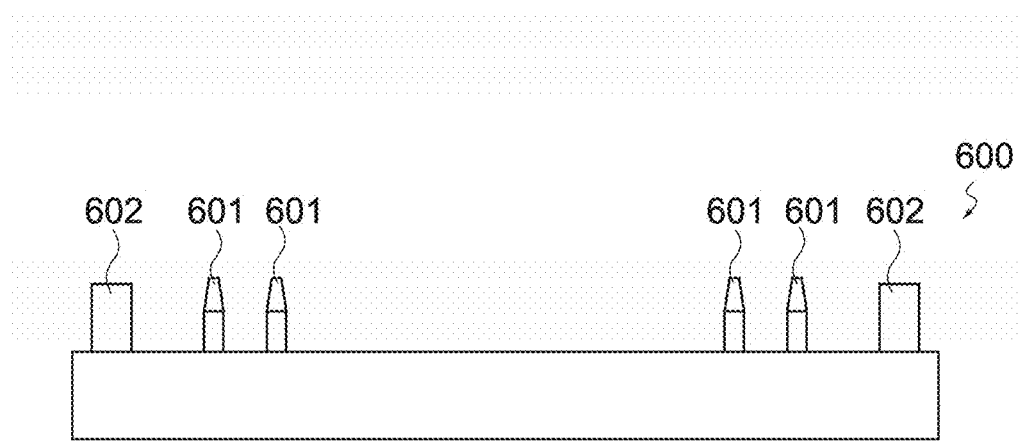
FIG. 32 A schematic view showing the manufacturing processes of the optical transmission module according to the embodiment of the present technology.

FIGS. 31 and 32 are plan views of a jig 600 used for manufacturing the optical transmission module 100. As shown in the figure, the jig 600 includes positioning pins 601 and optical waveguide sheet supporting portions 602.

Figure 33:
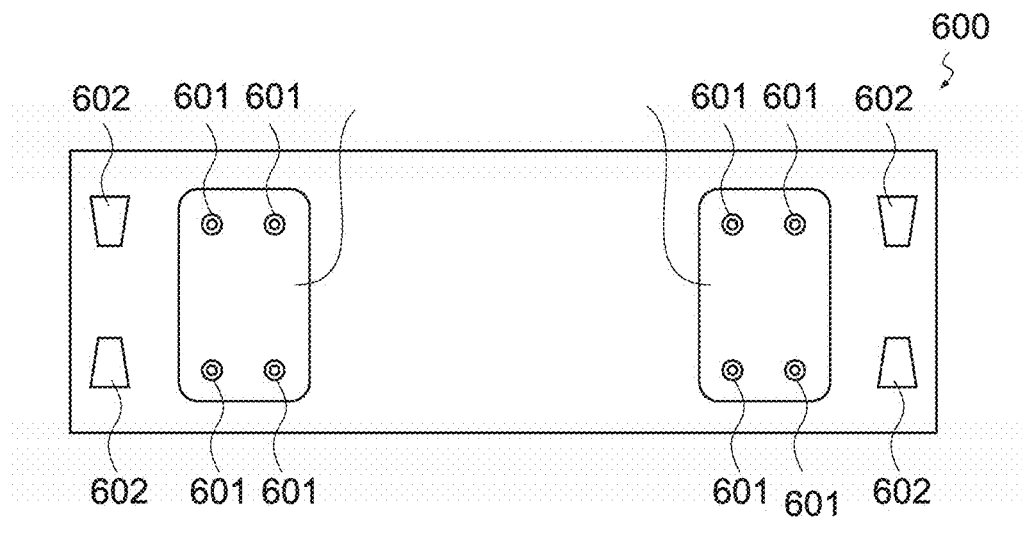
FIG. 33 A schematic view showing the manufacturing processes of the optical transmission module according to the embodiment of the present technology.
Figure 34:
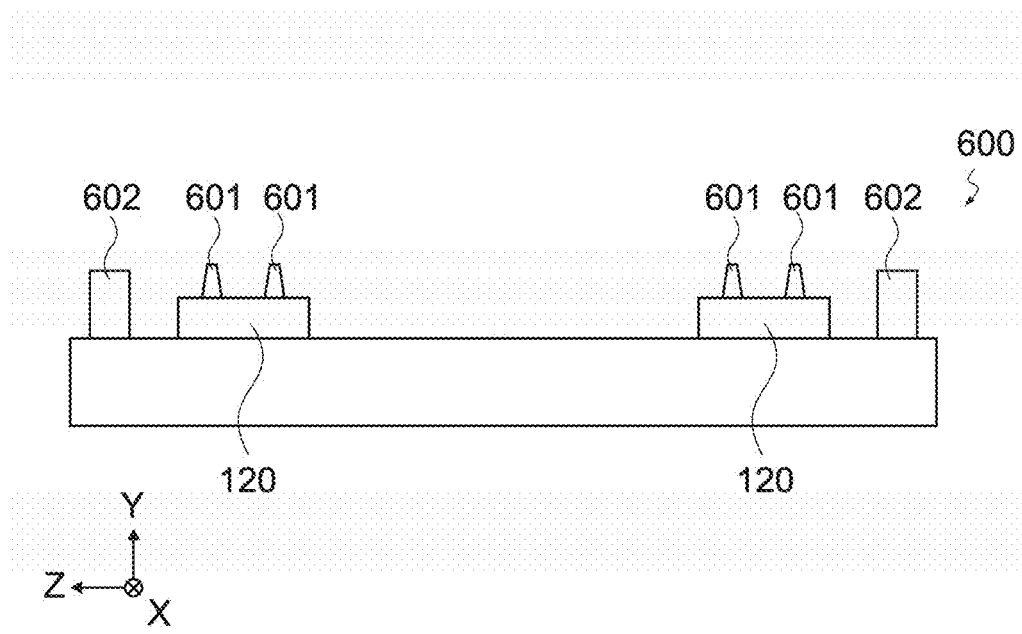
FIG. 34 A schematic view showing the manufacturing processes of the optical transmission module according to the embodiment of the present technology.

As shown in FIGS. 33 and 34, two optical connectors 120 are disposed on the jig 600. By inserting the positioning pins 601 into the positioning holes 120a, the optical connectors 120 can be positioned to the jig 600.

Figure 35:
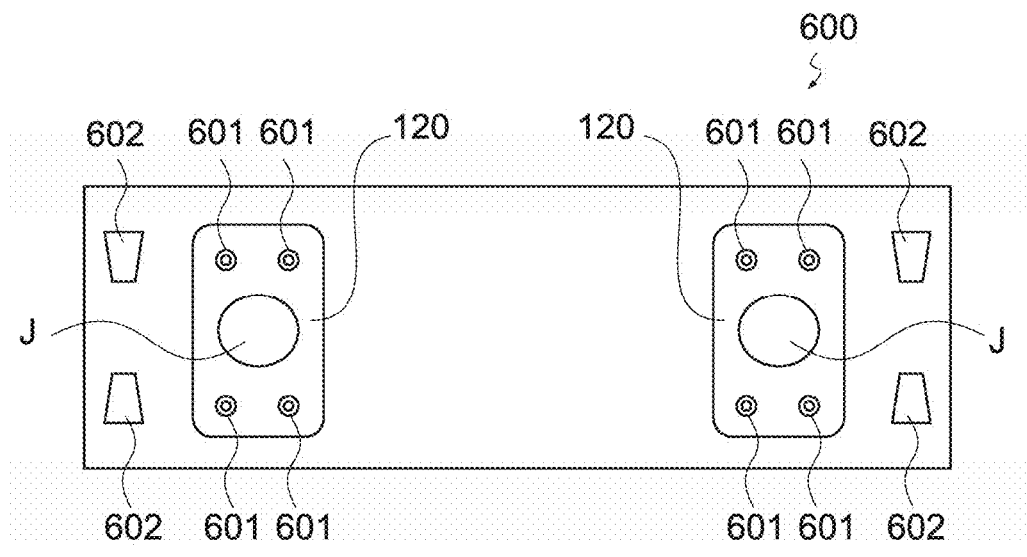
FIG. 35 A schematic view showing the manufacturing processes of the optical transmission module according to the embodiment of the present technology.
Figure 36:
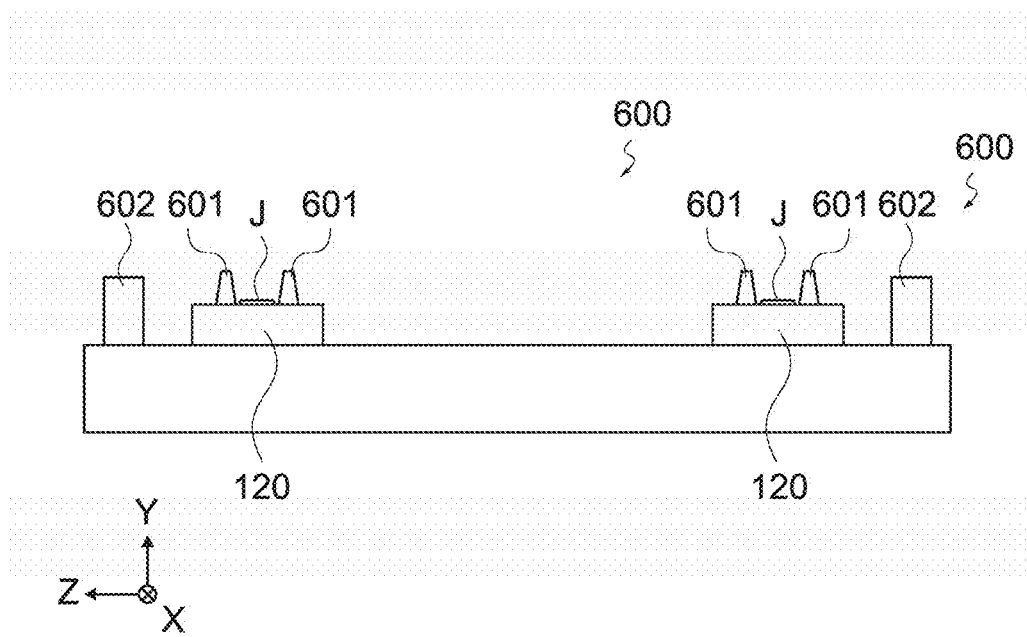
FIG. 36 A schematic view showing the manufacturing processes of the optical transmission module according to the embodiment of the present technology.

Subsequently, as shown in FIGS. 35 and 36, an adhesive J is dropped onto the optical connectors 120. The adhesive J is ultraviolet curable resin, for example.

Figure 37:
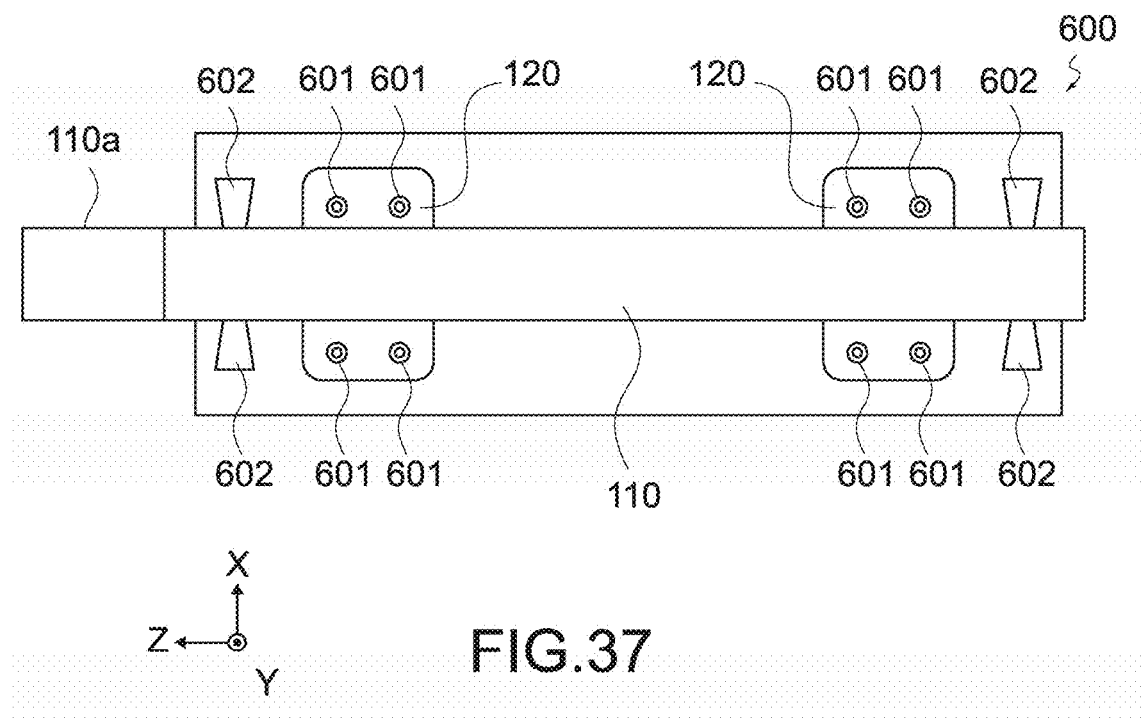
FIG. 37 A schematic view showing the manufacturing processes of the optical transmission module according to the embodiment of the present technology.
Figure 38:
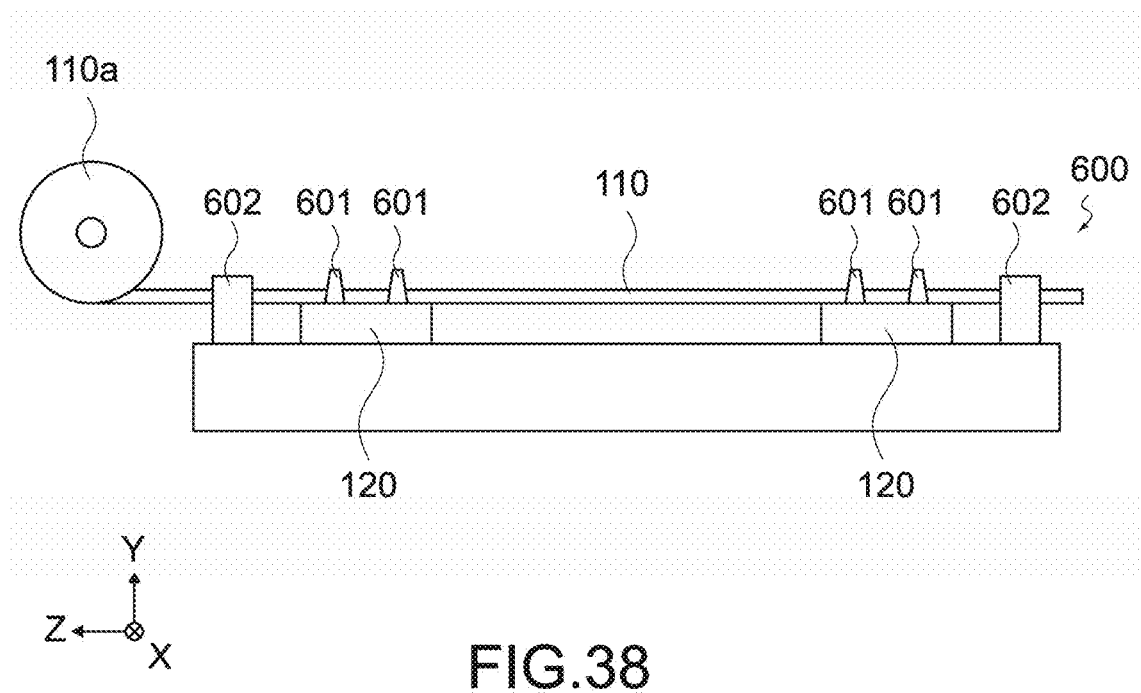
FIG. 38 A schematic view showing the manufacturing processes of the optical transmission module according to the embodiment of the present technology.

Subsequently, as shown in FIGS. 37 and 38, the optical waveguide sheet 110 is pulled out of an optical waveguide sheet roll 110a, around which the optical waveguide sheet 110 is wound, onto the optical connectors 120 and the adhesive J is cured. The adhesive J can be cured by being irradiated with ultraviolet rays. The optical waveguide sheet 110 can be positioned in the X direction by using the optical waveguide sheet supporting portions 602.

Subsequently, the reflection surfaces 115 (see FIG. 2) are formed. The reflection surfaces 115 can be provided in the maximum diameter portions 112a and the minimum diameter portions 112b which are opposed to the lenses 121 in the Y direction.

Figure 39:
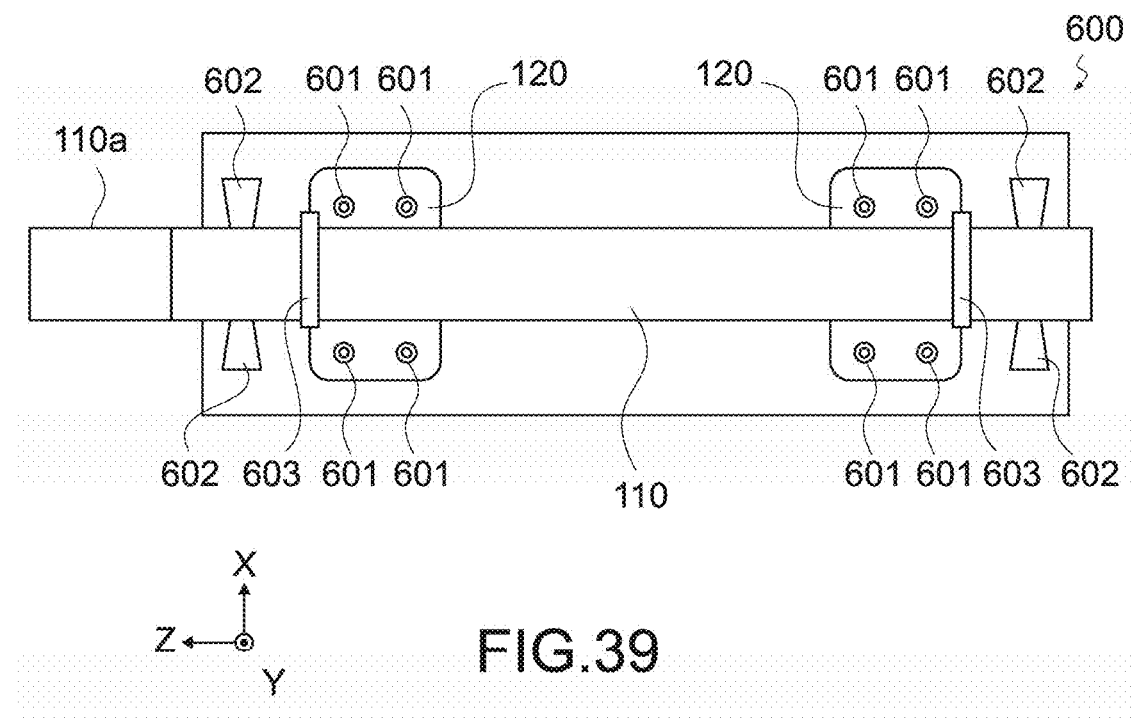
FIG. 39 A schematic view showing the manufacturing processes of the optical transmission module according to the embodiment of the present technology.
Figure 40:
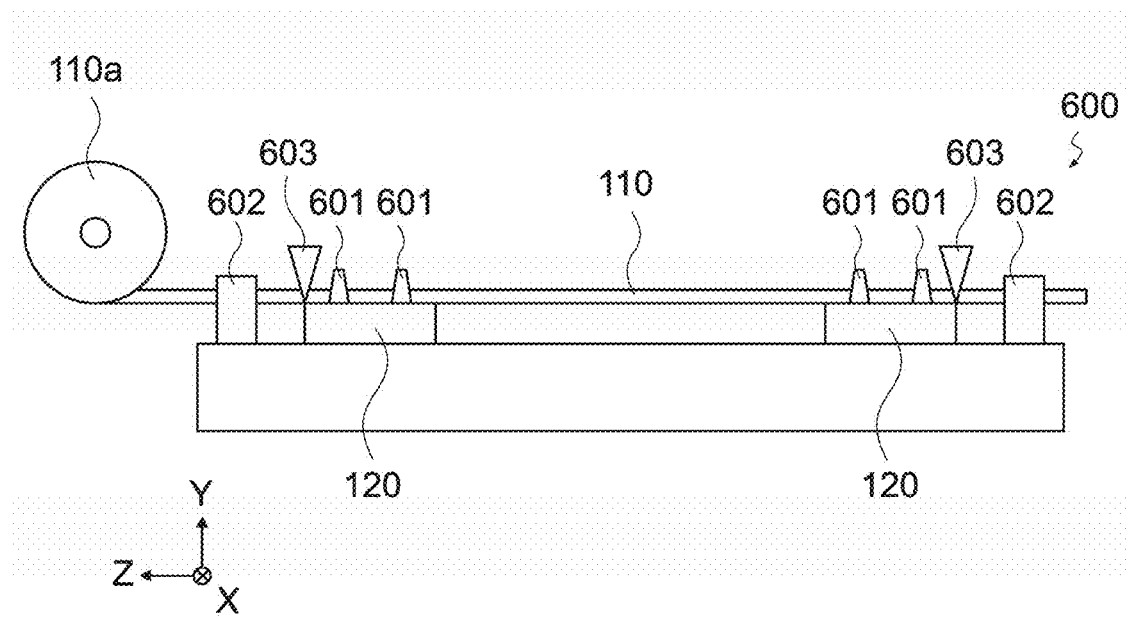
FIG. 40 A schematic view showing the manufacturing processes of the optical transmission module according to the embodiment of the present technology.

Subsequently, as shown in FIGS. 39 and 40, an unnecessary part of the optical waveguide sheet 110 is cut by a blade 603. In the above-mentioned manner, the optical transmission module 100 can be manufactured.

The number of maximum diameter portions 112a, minimum diameter portions 112b, and taper portions 112c of the optical waveguide sheet 110 that constitute the optical transmission module 100 can be selected in accordance with the intervals of the optical connectors 120 (length of the optical waveguide sheet 110). The optical waveguide sheet 110 only needs to include at least one maximum diameter portion 112a, at least one minimum diameter portion 112b, and at least one taper portion 112c.

Modified Examples

Figure 41:
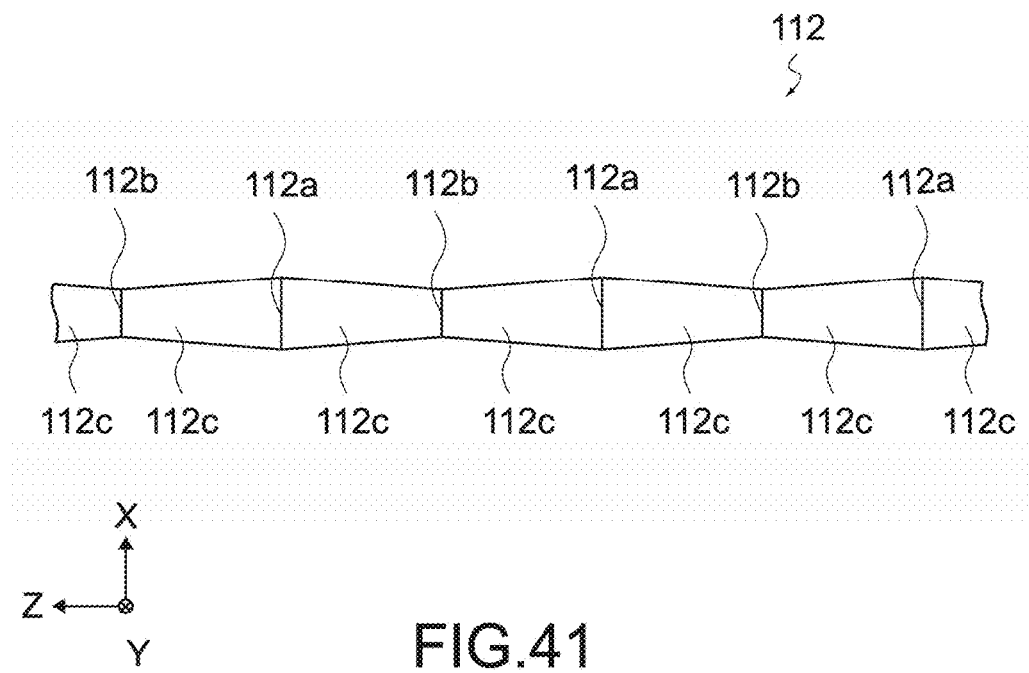
FIG. 41 A plan view of a core of an optical waveguide sheet according to a modified example of the present technology.
Figure 42:
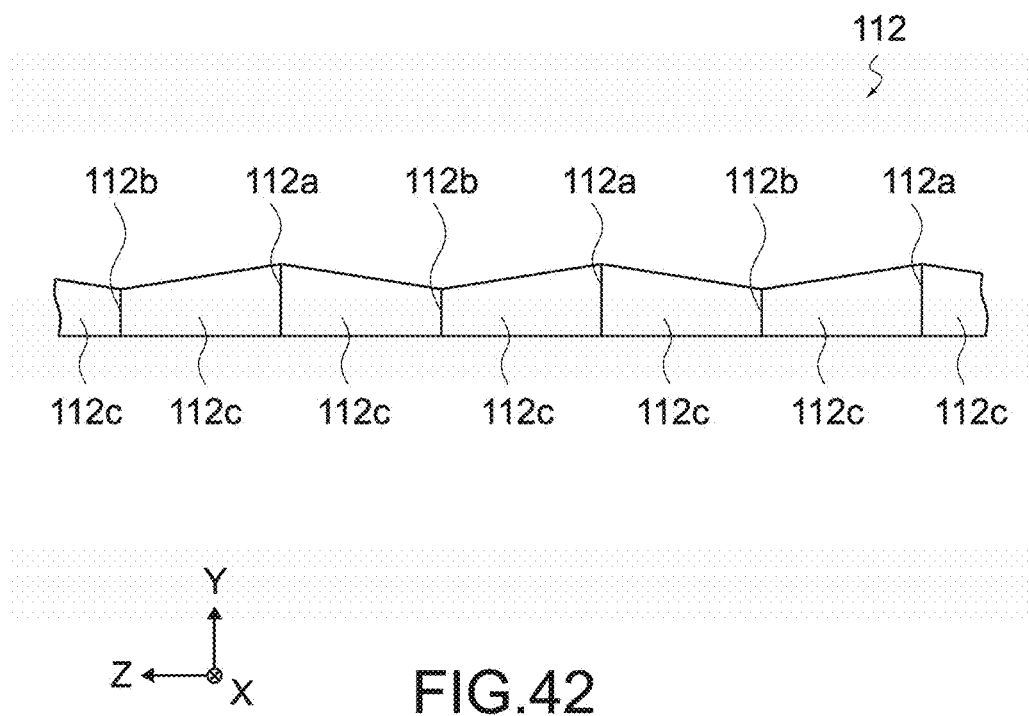
FIG. 42 A plan view of a core of an optical waveguide sheet according to a modified example of the present technology.

In the above-mentioned embodiment, the maximum diameter portions 112a and the minimum diameter portions 112b each have a fixed length in the X direction, though not limited thereto. FIG. 41 is a plan view of a core 112 according to a modified example as viewed in the Y direction. FIG. 42 is a plan view of the core 112 according to the modified example as viewed in the X direction.

As shown in these figures, the maximum diameter portions 112a and the minimum diameter portions 112b do not need to have a length in the X direction and may be planar portions provided between the taper portions 112c. However, when forming light incident surfaces or light-emitting surfaces in the maximum diameter portions 112a and the minimum diameter portions 112b, it is easy to perform positioning in a case where the maximum diameter portions 112a and the minimum diameter portions 112b each have a fixed length as in the above-mentioned embodiment.

Figure 43:
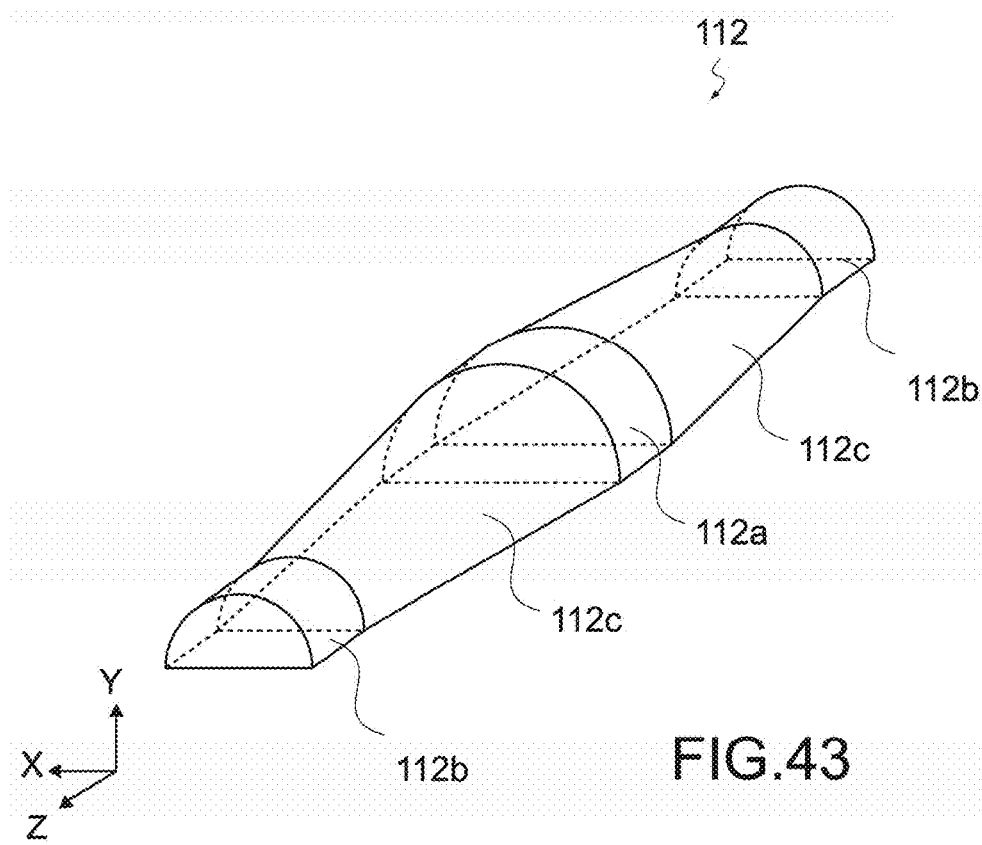
FIG. 43 A perspective view of a core of an optical waveguide sheet according to a modified example of the present technology.
Figure 44:
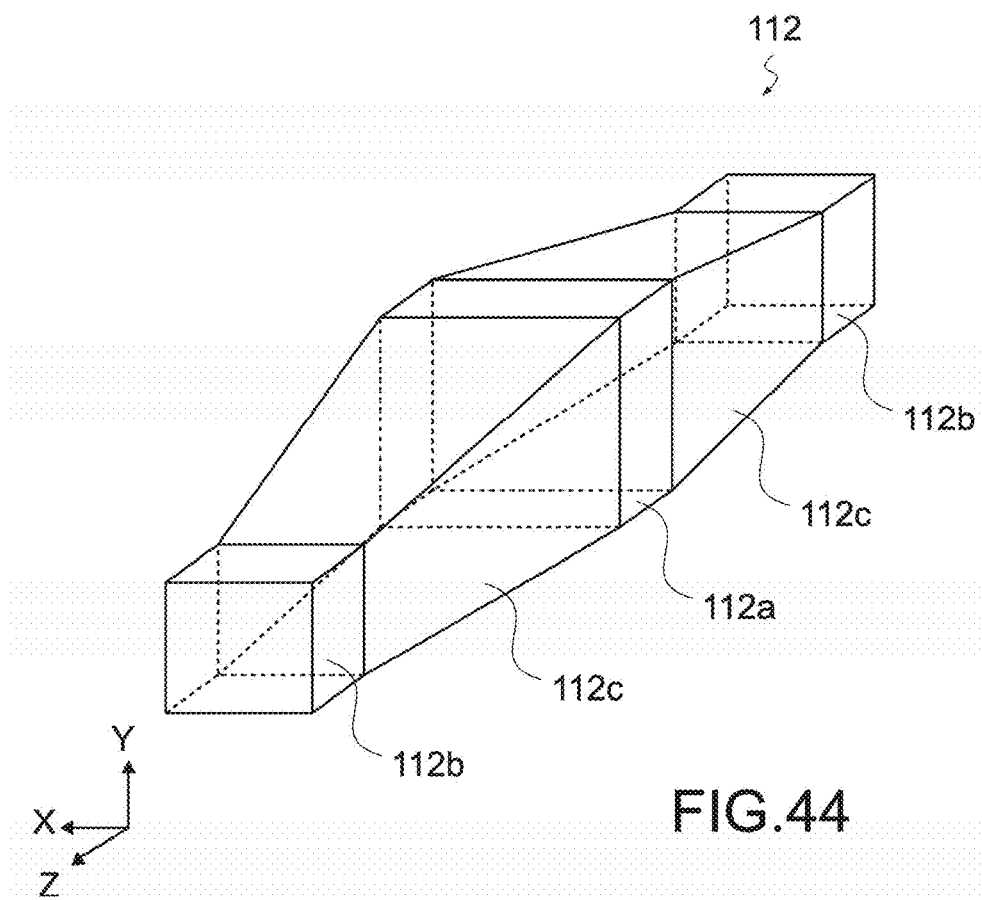
FIG. 44 A perspective view of a core of an optical waveguide sheet according to a modified example of the present technology.

Further, although the cross-section of the core 112 which is taken along with the X-Y plane has a trapezoidal shape in the above-mentioned embodiment, it is not limited thereto. FIGS. 43 and 44 are perspective views showing cores 112 according to modified examples. As shown in FIG. 43, the cross-section of the core 112 which is taken along with the X-Y plane may have a semi-circular shape. As shown in FIG. 44, the cross-section of the core 112 which is taken along with the X-Y plane may have a rectangular shape.

In addition, the cross-section of the core 112 which is taken along with the X-Y plane is not particularly limited, and any cross-section can be employed as long as the taper portion 112c has a two-dimensional taper shape such that widths change in two directions of the X direction and the Y direction. On the other hand, in a case of forming the cores 112 by the above-mentioned roll imprint method, it is easy to remove the cores 112 from the cylindrical transfer roll 502 with the shape having a width decreasing in the Z direction like the trapezoidal shape, which is more favorable.

Figure 45:
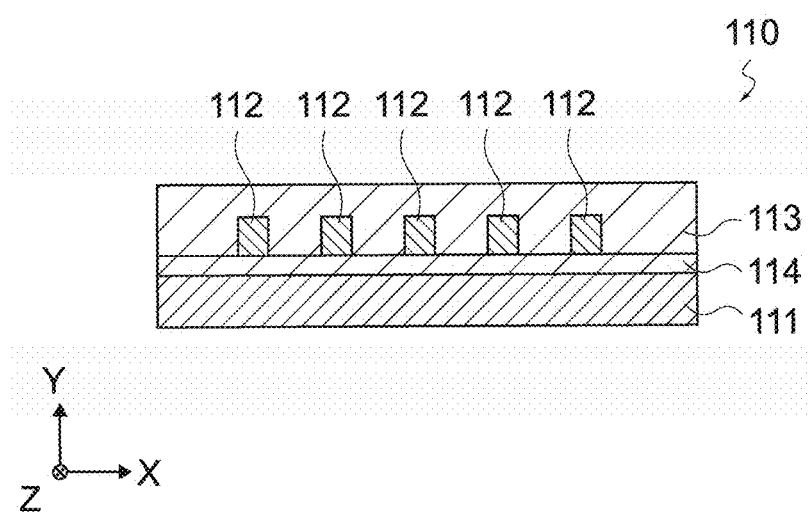
FIG. 45 A cross-sectional view of an optical waveguide sheet according to a modified example of the present technology.

Further, although the cores 112 are formed on the base material 111 (see FIG. 3) in the above-mentioned embodiment, it is not limited thereto. FIG. 45 is a cross-sectional view of an optical waveguide sheet 110 according to a modified example. As shown in the figure, the optical waveguide sheet 110 may include a lower cladding layer 114 in addition to the base material 111, the cores 112, and the cladding 113.

The lower cladding layer 114 can be formed on the base material 111 and the cores 112 and the cladding 113 can be formed on the lower cladding layer 113. The lower cladding layer 114 is made of ultraviolet curable resin and the like having a refractive index equivalent to that of the cladding 113. In this case, the base material 111 does not function as the cladding, and thus the material can be selected irrespective of the refractive index.

In the manufacturing processes (see FIG. 16) of the optical waveguide sheet 110, it is only necessary to apply and cure the cladding material to the base material 111 before the core material C1 is applied onto the base material 111. Thus, the lower cladding layer 114 is formed on the base material 111. By applying the core material C1 onto the lower cladding layer 114, the cores 112 can be formed.

It should be noted that the present technology may also take the following configurations.

(1)

An optical waveguide sheet, including:
a core extending in a first direction and including
  a maximum diameter portion in which a cross-sectional area of the core in a plane parallel to a second direction orthogonal to the first direction and a third direction orthogonal to the second direction is maximum,
  a minimum diameter portion in which the cross-sectional area of the core in the plane parallel to the second direction and the third direction is minimum, and
  a taper portion in which widths of the core in both directions of the second direction and the third direction gradually change in the first direction between the maximum diameter portion and the minimum diameter portion, the taper portion being continuous with the maximum diameter portion and the minimum diameter portion, the core being provided such that the maximum diameter portion and the minimum diameter portion are alternately arranged in the first direction with the taper portion therebetween; and
a cladding provided around the core.

(2)

The optical waveguide sheet according to (1), in which
the core includes a plurality of cores arranged in the second direction via the cladding.

(3)

The optical waveguide sheet according to (2), in which
the plurality of cores are provided such that the maximum diameter portions are opposed to each other and the minimum diameter portions are opposed to each other in the second direction.

(4)

The optical waveguide sheet according to (2), in which
the plurality of cores are provided such that the maximum diameter portions are opposed to the minimum diameter portions in the second direction between the adjacent cores.

(5)

The optical waveguide sheet according to any one of (1) to (4), in which
the maximum diameter portion and the minimum diameter portion each have a fixed length in the first direction.

(6)

The optical waveguide sheet according to any one of (1) to (5), further including
a sheet-like base material, in which
the core is formed on the base material, and
the cladding is formed on the base material and the core.

(7)

The optical waveguide sheet according to any one of (1) to (5), further including a sheet-like base material, in which
the cladding includes a first cladding formed on the base material and a second cladding formed on the first cladding and the core.

(8)

An optical transmission module, including:
an optical waveguide sheet including
a core extending in a first direction and including
  a maximum diameter portion in which a cross-sectional area of the core in a plane parallel to a second direction orthogonal to the first direction and a third direction orthogonal to the second direction is maximum,
  a minimum diameter portion in which the cross-sectional area of the core in the plane parallel to the second direction and the third direction is minimum, and
  a taper portion in which widths of the core in both directions of the second direction and the third direction gradually change in the first direction between the maximum diameter portion and the minimum diameter portion, the taper portion being continuous with the maximum diameter portion and the minimum diameter portion, the core being provided such that the maximum diameter portion and the minimum diameter portion are alternately arranged in the first direction with the taper portion therebetween, and
a cladding provided around the core;
a first optical connector that causes light to enter the maximum diameter portion; and
a second optical connector that light emitted from the minimum diameter portion enters.

(9)

A manufacturing method for an optical waveguide sheet, including:
applying a core material onto a sheet member;
transferring a shape of a groove to the core material by rotating a cylindrical transfer roll having a cylindrical surface in which the groove is formed while pressing the cylindrical transfer roll against the core material;
forming a core by curing the core material;
applying a cladding material onto the sheet member and the core; and
forming a cladding by curing the cladding material, in which
the groove has such a shape that
a core extends in a first direction and includes
a maximum diameter portion in which a cross-sectional area of the core in a plane parallel to a second direction orthogonal to the first direction and a third direction orthogonal to the second direction is maximum,
a minimum diameter portion in which the cross-sectional area of the core in the plane parallel to the second direction and the third direction is minimum, and
a taper portion in which widths of the core in both directions of the second direction and the third direction gradually change in the first direction between the maximum diameter portion and the minimum diameter portion, the taper portion being continuous with the maximum diameter portion and the minimum diameter portion, the core being provided such that the maximum diameter portion and the minimum diameter portion are alternately arranged in the first direction with the taper portion therebetween.

(10)

The manufacturing method for an optical waveguide sheet according to (9), further including a step of cutting the optical waveguide sheet in such a manner that the core includes at least one maximum diameter portion, at least one minimum diameter portion, and at least one taper portion.

(11)

The manufacturing method for an optical waveguide sheet according to (9) or (10), in which
the sheet member is conveyed in a roll-to-roll process.

(12)

The manufacturing method for an optical waveguide sheet according to any one of (9) to (11), in which
the sheet member is a base material, and
the step of applying the core material onto the sheet member includes applying the core material onto the base material.

(13)

The manufacturing method for an optical waveguide sheet according to any one of (9) to (11), in which
the sheet member includes a base material and a lower cladding layer stacked on the base material, and
the step of applying the core material onto the sheet member includes applying the core material onto the lower cladding layer.

REFERENCE SIGNS LIST 100 optical transmission module
110 optical waveguide sheet
111 base material
112 core
112a maximum diameter portion
112b minimum diameter portion
112c taper portion
113 cladding
114 lower cladding layer
500 roll imprint apparatus
502 cylindrical transfer roll
510 groove
510a maximum diameter portion
510b minimum diameter portion
510c taper portion

The invention claimed is:
1. An optical waveguide sheet, comprising:
a plurality of reflection surfaces;
a first core that extends in a first direction, wherein
the first core includes a plurality of portions that comprises a maximum diameter portion, a minimum diameter portion, and a taper portion,
a cross-sectional area of the maximum diameter portion is maximum among the plurality of portions of the first core,
the maximum diameter portion is in a plane parallel to a second direction and a third direction,
the second direction is orthogonal to the first direction,
the third direction is orthogonal to the second direction,
a cross-sectional area of the minimum diameter portion is minimum among the plurality of portions of the first core,
the minimum diameter portion is in the plane parallel to the second direction and the third direction,
the cross-sectional area, in the plane parallel to the second direction and the third direction, of the minimum diameter portion of the first core is in a trapezoidal shape having two parallel sides along the second direction and other two non-parallel sides,
a width of the taper portion gradually changes in the first direction between the maximum diameter portion and the minimum diameter portion,
the taper portion is continuous with the maximum diameter portion and the minimum diameter portion,
the maximum diameter portion and the minimum diameter portion are alternately arranged in the first direction with the taper portion between the maximum diameter portion and the minimum diameter portion,
a first reflection surface of the plurality of reflection surfaces is in the first core, and
light enters the first core via the plurality of reflection surfaces from the third direction orthogonal to the first direction;
a first cladding structure around the first core; and
a sheet-like base material, wherein
the sheet-like base material is below the first core and the first cladding structure, and
the sheet-like base material comprises a synthetic resin.

2. The optical waveguide sheet according to claim 1, further comprising a plurality of cores in the second direction via the first cladding structure, wherein the plurality of cores includes the first core.

3. The optical waveguide sheet according to claim 2, wherein arrangement of the plurality of cores is such that:
the maximum diameter portion of the first core is opposed to a maximum diameter portion, of a second core of the plurality of cores, in the second direction, and
the minimum diameter portion of the first core is opposed to a minimum diameter portion of the second core in the second direction.

4. The optical waveguide sheet according to claim 2, wherein
arrangement of the plurality of cores is such that the maximum diameter portion of the first core is opposed to a minimum diameter portion, of a second core of the plurality of cores, in the second direction, and
the first core is adjacent to the second core.

5. The optical waveguide sheet according to claim 1, wherein each of the maximum diameter portion and the minimum diameter portion has a fixed length in the second direction.

6. The optical waveguide sheet according to claim 1, wherein the first core is on the sheet-like base material.

7. The optical waveguide sheet according to claim 1, wherein
the first reflection surface of the plurality of reflection surfaces is in the maximum diameter portion of the first core, and
a second reflection surface of the plurality of reflection surfaces is in the minimum diameter portion of the first core.

8. The optical waveguide sheet according to claim 1, further comprising a second cladding structure, wherein
each of the first cladding structure and the first core is on the second cladding structure, and
the second cladding structure is on the sheet-like base material.

9. An optical transmission module, comprising:
an optical waveguide sheet including:
a plurality of reflection surfaces;
a core that extends in a first direction, wherein
the core includes a plurality of portions that comprises a maximum diameter portion, a minimum diameter portion, and a taper portion, a cross-sectional area of the maximum diameter portion is maximum among the plurality of portions of the core,
the maximum diameter portion is in a plane parallel to a second direction and a third direction,
the second direction is orthogonal to the first direction,
the third direction is orthogonal to the second direction,
a cross-sectional area of the minimum diameter portion is minimum among the plurality of portions of the core,
the minimum diameter portion is in the plane parallel to the second direction and the third direction,
the cross-sectional area, in the plane parallel to the second direction and the third direction, of the minimum diameter portion of the core is in a trapezoidal shape having two parallel sides along the second direction and other two non-parallel sides,
a width of the taper portion gradually changes in the first direction between the maximum diameter portion and the minimum diameter portion,
the taper portion is continuous with the maximum diameter portion and the minimum diameter portion,
the maximum diameter portion and the minimum diameter portion are alternately arranged in the first direction with the taper portion between the maximum diameter portion and the minimum diameter portion,
a reflection surface of the plurality of reflection surfaces is in the core, and
light enters the core via the plurality of reflection surfaces from the third direction orthogonal to the first direction;
a cladding structure around the core; and
a sheet-like base material, wherein
the sheet-like base material is below the core and the cladding structure, and
the sheet-like base material comprises a synthetic resin;
a first optical connector that causes the light to enter the maximum diameter portion of the core via the first optical connector; and
a second optical connector, wherein the light is emitted from the minimum diameter portion of the core via the second optical connector.

10. A manufacturing method for an optical waveguide sheet, comprising:
applying a core material onto a sheet member, wherein the sheet member comprises a synthetic resin;
transferring a shape of a groove to the core material by rotating a cylindrical transfer roll, wherein the cylindrical transfer roll comprises a cylindrical surface, and
the groove is formed while pressing the cylindrical transfer roll against the core material;
forming a core by curing the core material, wherein the core comprises a plurality of portions that includes a maximum diameter portion, a minimum diameter portion, and
a taper portion;
applying a cladding material onto the sheet member and the core; and
forming a cladding structure by curing the cladding material, wherein
the groove has the shape such that the core extends in a first direction,
a cross-sectional area of the maximum diameter portion is maximum among the plurality of portions of the core,
the maximum diameter portion is in a plane parallel to a second direction and a third direction,
the second direction is orthogonal to the first direction,
the third direction is orthogonal to the second direction,
a cross-sectional area of the minimum diameter portion is minimum among the plurality of portions of the core,
the minimum diameter portion is in the plane parallel to the second direction and the third direction,
the cross-sectional area, in the plane parallel to the second direction and the third direction, of the minimum diameter portion of the core is in a trapezoidal shape having two parallel sides along the second direction and other two non-parallel sides,
a width of the taper portion gradually changes in the first direction between the maximum diameter portion and the minimum diameter portion,
the taper portion is continuous with the maximum diameter portion and the minimum diameter portion,
the maximum diameter portion and the minimum diameter portion are alternately arranged in the first direction with the taper portion between the maximum diameter portion and the minimum diameter portion,
a reflection surface is in the core, and
light enters the core via the reflection surface from the third direction orthogonal to the first direction.

11. The manufacturing method according to claim 10, further comprising cutting the optical waveguide sheet such that the core includes the maximum diameter portion, the minimum diameter portion, and the taper portion.

12. The manufacturing method according to claim 10, wherein the sheet member is conveyed in a roll-to-roll process.

* * * * *